(12) United States Patent
Kim et al.

(10) Patent No.: US 12,108,340 B2
(45) Date of Patent: Oct. 1, 2024

(54) WIRELESS COMMUNICATION METHOD USING MULTILINK AND WIRELESS COMMUNICATION TERMINAL USING SAME

(71) Applicant: WILUS INSTITUTE OF STANDARDS AND TECHNOLOGY INC., Gyeonggi-do (KR)

(72) Inventors: Sanghyun Kim, Gyeonggi-do (KR); Geonjung Ko, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

(21) Appl. No.: 18/437,244

(22) Filed: Feb. 9, 2024

(65) Prior Publication Data

US 2024/0251355 A1    Jul. 25, 2024

Related U.S. Application Data

(63) Continuation of application No. PCT/KR2022/012062, filed on Aug. 11, 2022.

(30) Foreign Application Priority Data

Aug. 11, 2021  (KR) .................. 10-2021-0106369
Jul. 4, 2022    (KR) .................. 10-2022-0082157
(Continued)

(51) Int. Cl.
*H04W 52/02*    (2009.01)

(52) U.S. Cl.
CPC .............. *H04W 52/0235* (2013.01)

(58) Field of Classification Search
CPC ................................. H04W 52/0235
(Continued)

(56) References Cited

U.S. PATENT DOCUMENTS

| 2022/0279602 | A1* | 9/2022 | Xue .................. H04W 52/0241 |
| 2023/0025546 | A1 | 1/2023 | Hu et al. |
| 2023/0284215 | A1 | 9/2023 | Shafin et al. |

FOREIGN PATENT DOCUMENTS

| WO | 2023/018269 | 2/2023 |
| WO | 2023/191501 | 10/2023 |

OTHER PUBLICATIONS

International Search Report for PCT/KR2022/012062 mailed on Nov. 22, 2022 and its English translation from WIPO (now published as WO2023/018269).
(Continued)

*Primary Examiner* — Inder P Mehra
(74) *Attorney, Agent, or Firm* — Womble Bond Dickinson (US) LLP

(57) ABSTRACT

Disclosed are a traffic transmission method and device, the method being performed by a terminal in a wireless communication system. Specifically, a non-access point (AP) STA of the present invention can receive, from an AP, a trigger frame triggering the transmission of a physical layer protocol data unit (PPDU). The trigger frame includes information indicating at least one traffic identifier (TID) that is allowed to be transmitted in a target wake time (TWT) period. The TWT period may indicate a period in which the transmission of traffic for the at least one TID having a specific transmission condition is allowed, and the transmission of traffic not having the specific transmission condition is restricted. Thereafter, the non-AP STA transmits a PPDU, including the traffic corresponding to the at least one TID, to the AP within the TWT period.

14 Claims, 23 Drawing Sheets

(30) Foreign Application Priority Data

Jul. 21, 2022 (KR) ........................ 10-2022-0090645
Jul. 22, 2022 (KR) ........................ 10-2022-0091358

(58) Field of Classification Search
USPC ........................................................ 370/311
See application file for complete search history.

(56) References Cited

OTHER PUBLICATIONS

Written Opinion of the International Searching Authority for PCT/KR2022/012062 mailed on Nov. 22, 2022 and its English translation by Google Translate (now published as WO2023/018269).
Hu, Chunyu et al.: "Traffic Prioritization During the Restricted TWT SPs", IEEE 802.11-21/1115r0, Jul. 27, 2021, slides 1-14.
Hu, Chunyu et al.: "Prioritized EDCA Channel Access", IEEE 802.11-20/1045r3, Aug. 25, 2020, slides 1-43.
Hu, Chunyu et al.: "Protected TWT Enhancement for Latency Sensitive Traffic", IEEE 802.11-20/1046r14, Feb. 25, 2021, slides 1-22.
Shafin, Rubayet et al.: "Handling Fairness Issue in Restricted TWT", doc.: IEEE 802.11-21/1020r1, Aug. 9, 2021, slides 1-13.
Lu, Liuming et al.: "35.6.4 Channel Access rules for restricted TWT service periods", doc.: IEEE 802.11-21/1291r0, filed Aug. 6, 2021, pp. 1-3.
Hu, Chunyu et al.: "Restricted TWT Spec Text Restricted TWT Additional Rules", doc.: IEEE 802.11-21/1802r9, Nov. 2021, pp. 1-7.
Hu, Chunyu et al.: "Restricted TWT Spec Text Restricted TWT Additional Rules", doc.: IEEE 802.11-21/1802r0, Nov. 2021, pp. 1-7.

* cited by examiner

FIG. 11
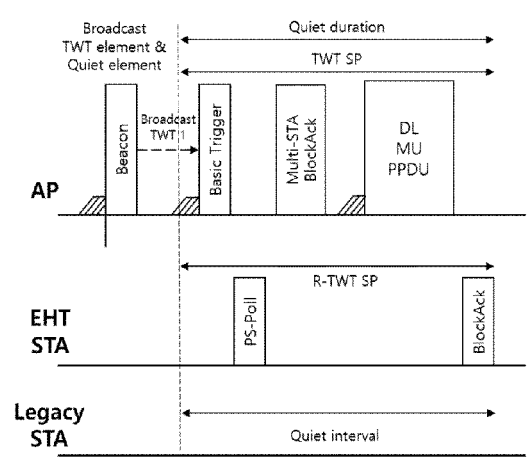
(a) R-TWT SP == Quiet duration
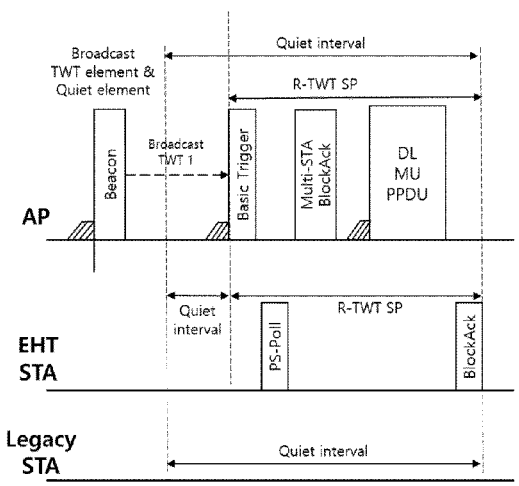
(b) R-TWT SP < Quiet duration FIG. 12
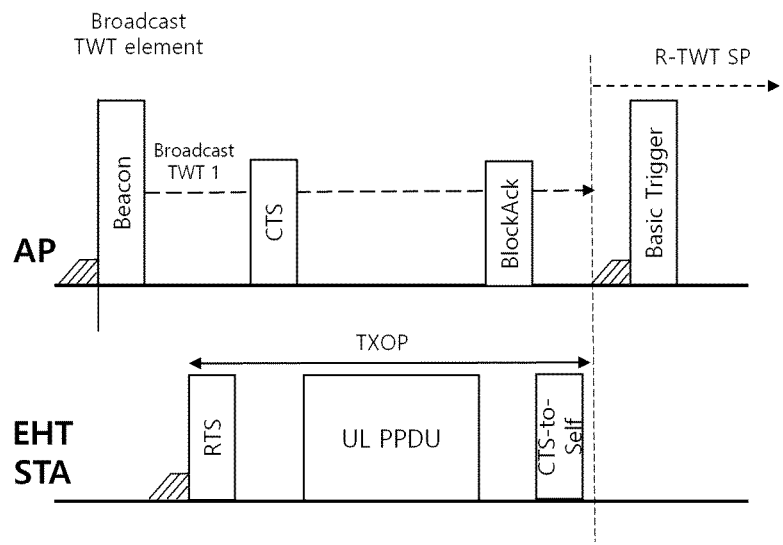
(a) Short TXOP
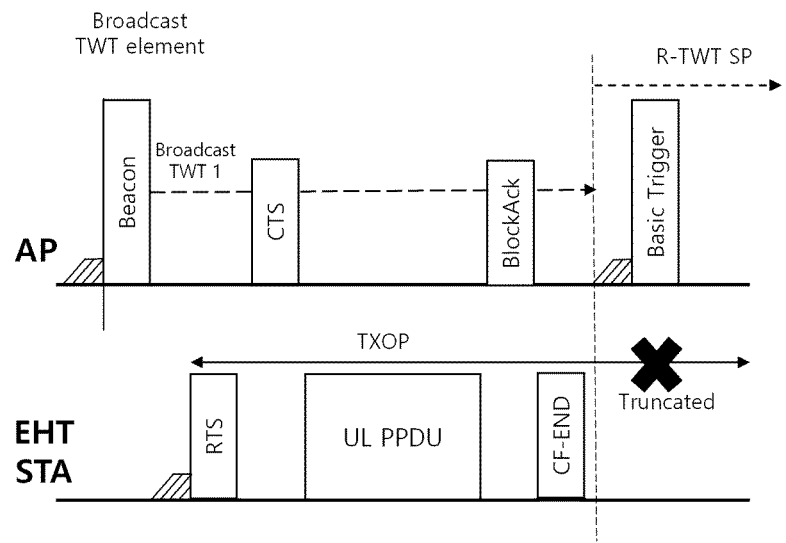
(b) TXOP truncation R-TWT SP termination(truncation)

FIG. 15

| Request Type | Target Wake Time | Nominal Minimum TWT Wake Duration | TWT Wake Interval Mantissa | Broadcast TWT Info | Restricted TWT Traffic Info (Optional) |
|---|---|---|---|---|---|
| 2 | 2 | 1 | 2 | 2 | 0 or 1 or 2 or 3 |

Octets:

(a) Broadcast TWT Parameter Set field format

| Restricted TWT Traffic Info Present | Reserved | Broadcast TWT ID | Broadcast TWT Persisentece |
|---|---|---|---|
| 1 | 2 | 5 | 8 |

Bits:

(b) Broadcast TWT Info field

FIG. 16

| Traffic Info Control | Restricted TWT DL TID Bitmap | Restricted TWT UL TID Bitmap |
|---|---|---|

Octets: 1     0 or 1     0 or 1

(a) Restricted TWT Traffic Info field

| DL TID Bitmap Valid | UL TID Bitmap Valid | Reserved |
|---|---|---|

Bits: 1     1     6

(b) Traffic Info Control field

FIG. 17

| Broadcast TWT Recommendation field value | Description when transmitted in a broadcast TWT element |
|---|---|
| ... | ... |
| 4 | The corresponding broadcast TWT service period is referred to as a restricted TWT (R-TWT) service period. |
| 5 | The corresponding broadcast TWT service period is referred to as a TID restricted TWT (TID-R-TWT) service period |
| 6-7 | Reserved |

FIG. 18

| B0 | | | | | | | B25 |
|---|---|---|---|---|---|---|---|
| Trigger Type | UL Length | More TF | CS Requeired | UL BW | GI And EHT-LTF Type | MU-MIMO EHT-LTF Mode | Number of EHT-LTF Symbols... |

Bits: 4 | 12 | 1 | 1 | 2 | 2 | 1 | 3

| B26 | | | | | | | B54 |
|---|---|---|---|---|---|---|---|
| UL STBC | LDPC Extra Symbol Segment | AP Tx Power | Pre-FEC Padding Factor | PE Disambiguity | UL Satial Reuse | Doppler | HE/EHT P160 |

Bits: 1 | 1 | 6 | 2 | 1 | 16 | 1 | 1

| B55 | B56 | B63 |
|---|---|---|
| Special User Info Field Present | Low latency TID Bitmap | Trigger Dependent Common Info |

Bits: 1 | 8 | 0 (not present)

FIG. 19

| B0 | B1 | B2 | B4 | B5 | B7 |
|---|---|---|---|---|---|
| MPDU MU Spacing Factor | | TID Aggregation Limit | | Low latency TID | |

Bits:           2                         3                         3

Trigger Dependent User Info subfield format in the Basic Trigger frame during rTWT SP

WIRELESS COMMUNICATION METHOD USING MULTILINK AND WIRELESS COMMUNICATION TERMINAL USING SAME

CROSS-REFERENCE TO RELATED APPLICATIONS

This application is a continuation of International Patent Application No. PCT/KR2022/012062 filed on Aug. 11, 2022, which claims the priority to Korean Patent Application No. 10-2021-0106369 filed in the Korean Intellectual Property Office on Aug. 11, 2021, Korean Patent Application No. 10-2022-0082157 filed in the Korean Intellectual Property Office on Jul. 4, 2022, Korean Patent Application No. 10-2022-0090645 filed in the Korean Intellectual Property Office on Jul. 21, 2022, and Korean Patent Application No. 10-2022-0091358 filed in the Korean Intellectual Property Office on Jul. 22, 2022, the entire contents of which are incorporated herein by reference.

TECHNICAL FIELD

The present invention relates to a wireless communication method using multiple links, and a wireless communication terminal using the same.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHZ) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHZ), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHZ, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band.

DISCLOSURE OF INVENTION

Technical Problem

An embodiment of the present invention is to provide a wireless communication method using multiple links, and a wireless communication terminal using the same.

In addition, an embodiment of the present invention is to provide a method for transmitting traffic in a restricted period.

Technical tasks to be achieved in the specification are not limited to the technical tasks mentioned above, and other technical tasks that are not mentioned may be clearly understood by those skilled in the art on the basis of the following descriptions.

Solution to Problem

A terminal (non-AP STA) for transmitting traffic in a wireless communication system by the present invention includes a transceiver and a processor, wherein the processor receives a trigger frame for triggering transmission of a physical layer protocol data unit (PPDU) from an access point (AP), wherein the trigger frame includes information indicating at least one traffic identifier (TID) allowed to be transmitted in a target wake time (TWT) period, and the TWT period indicates a period in which transmission of traffic for the at least one TID having a specific transmission condition is allowed and transmission of traffic not having the specific transmission condition is restricted, and transmits a PPDU including traffic corresponding to the at least one TID to the AP within the TWT period.

In addition, in the present invention, the trigger frame is transmitted within the TWT period.

In addition, in the present invention, a medium access control (MAC) protocol data unit (MPDU) including traffic corresponding another TID remaining after excluding the at least TID is aggregated with an MPDU of the PPDU including the traffic corresponding to the at least one TID and is transmitted in a form of an aggregated (A)-MPDU.

In addition, in the present invention, traffic for a TID corresponding to an access category (AC) of the at least one TID is allowed to be transmitted within the TWT period.

In addition, in the present invention, the TWT period includes a first period and a second period, the first period corresponds to a period in which transmission of the traffic corresponding to the at least one TID is only allowed, and the second period corresponds to a period in which transmission of traffic corresponding to a TID other than the at least one TID is allowed.

In addition, in the present invention, the specific transmission condition corresponds to a condition related to a transmission delay.

In addition, in the present invention, a channel access procedure by enhanced distributed channel access (EDCA) for another AC remaining after excluding an AC corresponding to the at least one TID is restricted within the TWT period.

In addition, in the present invention, a backoff counter of the channel access procedure by the EDCA for another AC is not reduced within the TWT period.

In addition, in the present invention, a state of a channel for the channel access procedure by the EDCA for another AC within the TWT period is a busy state until the TWT period ends.

In addition, the present invention provides a wireless communication method including receiving a trigger frame for triggering transmission of a physical layer protocol data unit (PPDU) from an access point (AP), wherein the trigger frame includes information indicating at least one traffic identifier (TID) allowed to be transmitted in a target wake time (TWT) period, and the TWT period indicates a period in which transmission of traffic for the at least one TID having a specific transmission condition is allowed and transmission of traffic not having the specific transmission condition is restricted, and transmitting a PPDU including traffic corresponding to the at least one TID to the AP within the TWT period.

Advantageous Effects of Invention

An embodiment of the present invention provides a wireless communication method efficiently using multiple links, and a wireless communication terminal using the same.

The effects obtainable in the present invention are not limited to the above-mentioned effects, and other effects that are not mentioned may be clearly understood by those skilled in the art to which the present invention belongs, from descriptions below.

BRIEF DESCRIPTION OF DRAWINGS

FIG. 11 illustrates configuring a quiet interval by an AP according to an embodiment of the present invention.

FIG. 12 illustrates a method of configuring a TXOP in consideration of a restricted service period by a station according to an embodiment of the present invention.

FIG. 15 illustrates an example of a target wake time (TWT) element for configuring a broadcast TWT service period (SP) according to an embodiment of the present invention.

FIG. 16 illustrates an example of a restricted TWT traffic information field for configuring a restricted TWT SP according to an embodiment of the present invention.

FIG. 17 illustrates a value of a field included in a broadcast TWT parameter set field according to an embodiment of the present invention.

FIG. 18 illustrates an example of a format of a trigger frame including information on a TID of traffic transmittable in a restricted TWT SP according to an embodiment of the present invention.

FIG. 19 illustrates an example of a format of a user information field of a trigger frame including information on a TID of traffic transmittable in a restricted TWT SP according to an embodiment of the present invention.

BEST MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively. Hereinafter, in the present invention, a field and a subfield may be interchangeably used.

Figure 1:
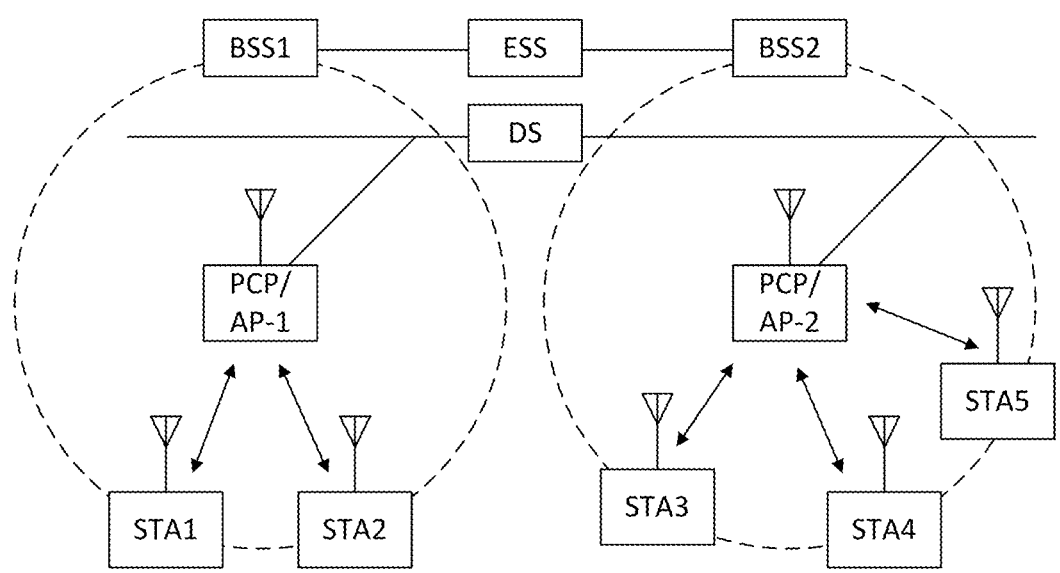
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. cNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
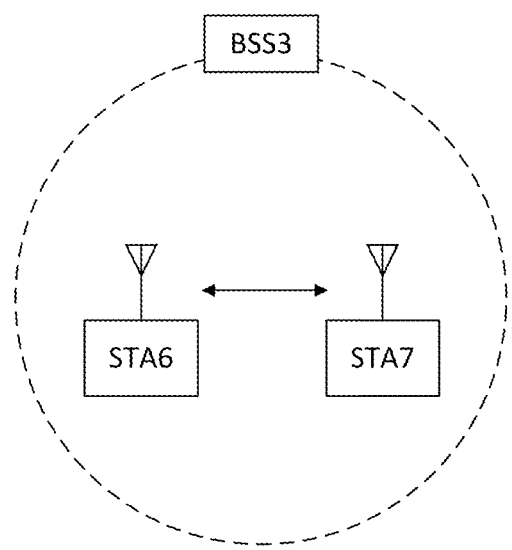
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
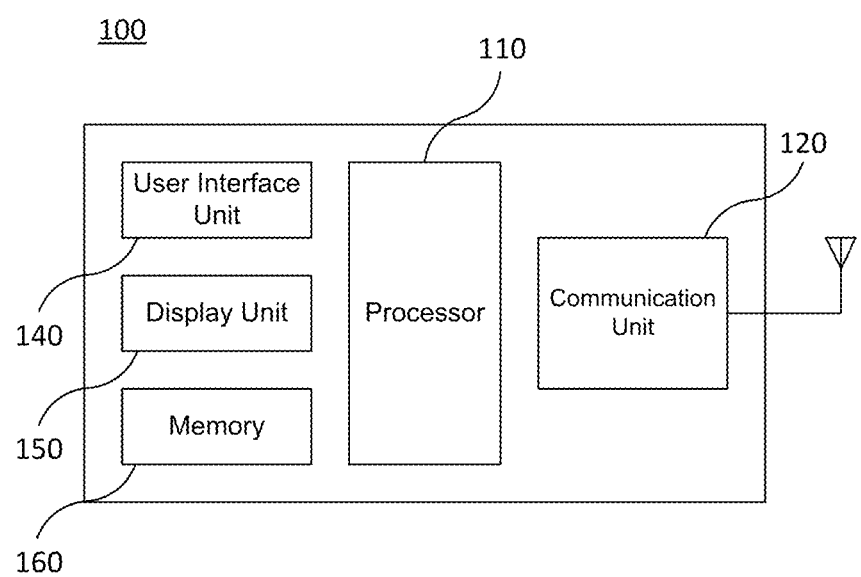
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHZ, 6 GHZ and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
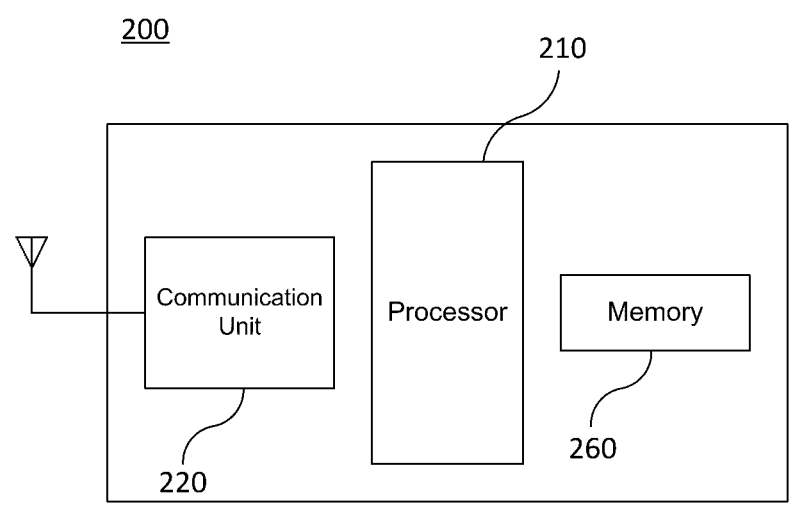
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHZ, 6 GHZ and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
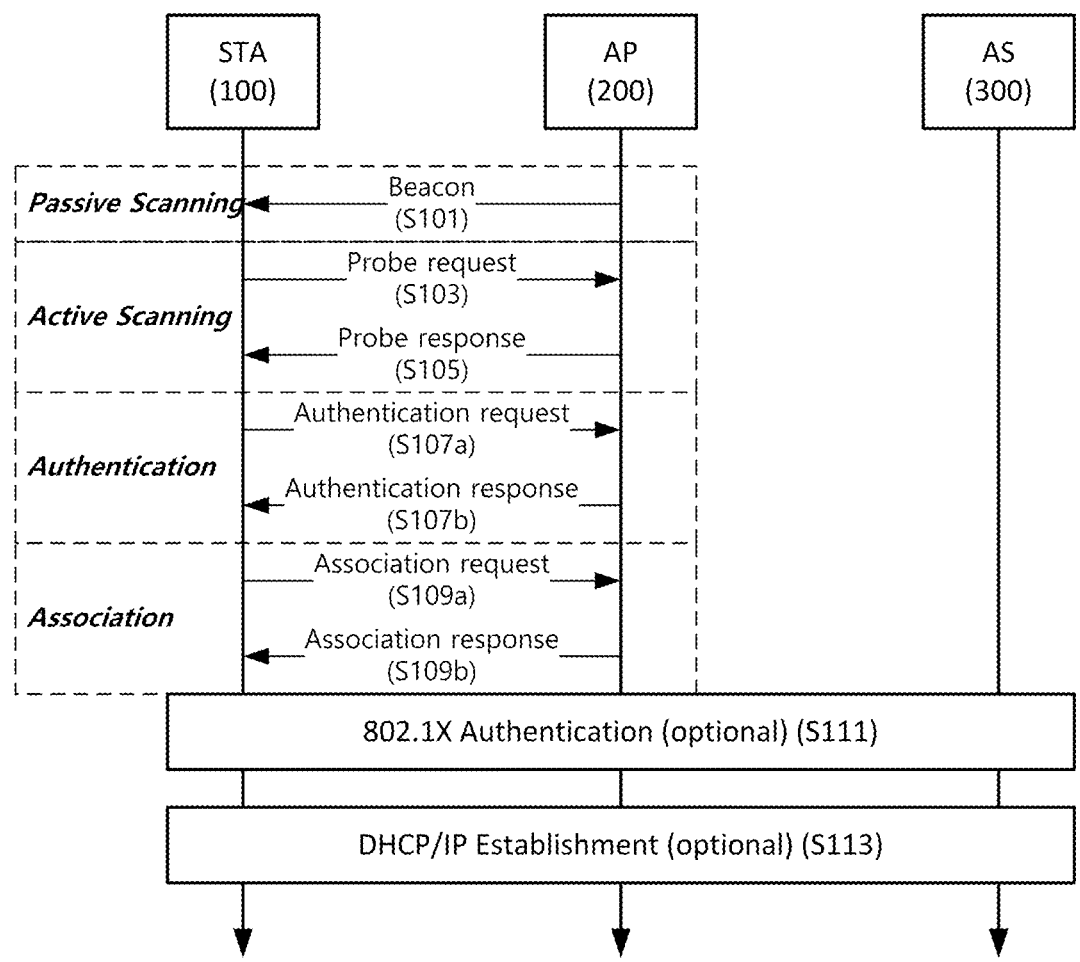
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
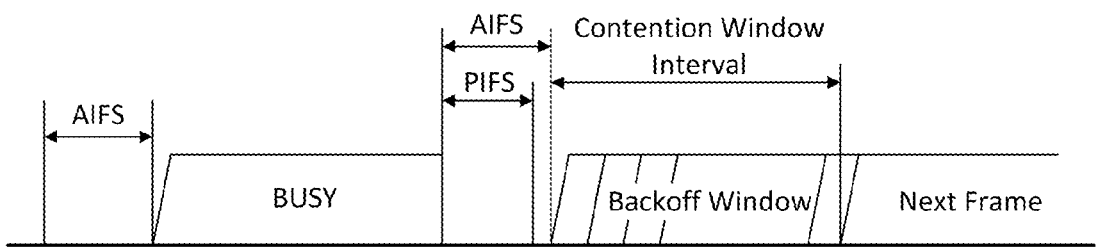
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Hereinafter, in the present invention, a terminal may be referred to as a non-AP STA, an AP STA, an AP, an STA, a reception device, or a transmission device, and the present invention is not limited thereto. In addition, in the present invention, an AP STA may be referred to as an AP.

Examples of Various PPDU Formats

Figure 7:
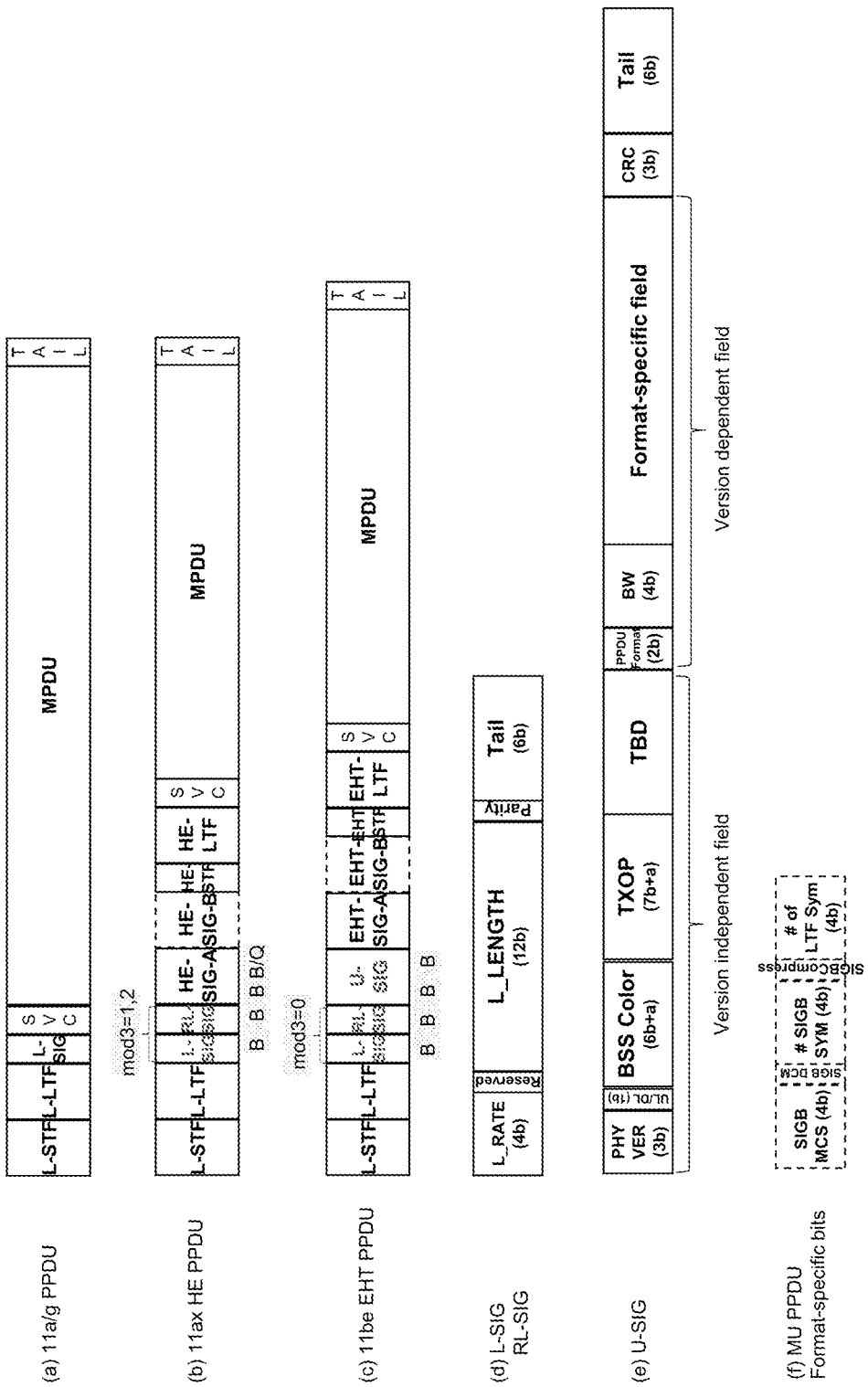
FIG. 7 illustrates an example of a format of a PLCP Protocol data unit (PPDU) for each of various standard generations.

FIG. 7 illustrates an example of a format of a PLCP Protocol data unit (PPDU) for each of various standard generations. More specifically, FIG. 7(a) illustrates an embodiment of a legacy PPDU format based on 802.11a/g, FIG. 7(b) illustrates an embodiment of an HE PPDU format based on 802.11ax, and FIG. 7(c) illustrates an embodiment of a non-legacy PPDU (i.e., EHT PPDU) format based on 802.11be. FIG. 7(d) illustrates detailed field configurations of RL-SIG and L-SIG commonly used in the PPDU formats.

Referring to FIG. 7(a), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(b), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(c), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=½ are applied in L-SIG, and therefore the L-SIG may include a total of 24 bits of information. FIG. 7(d) illustrates a 24-bit information configuration of L-SIG.

Referring to FIG. 7(d), the L-SIG includes an L_RATE field and an L_LENGTH field. The L_RATE field includes 4 bits and indicates an MCS used for data transmission. Specifically, the L_RATE field indicates one value among transmission rates of 6/9/12/18/24/36/48/54 Mbps obtained by combining a modulation scheme of BPSK/QPSK/16-QAM/64-QAM, etc. and an inefficiency of ½, ⅔, ¾, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of an L_LENGTH field is a byte, and a total of 12 bits may be allocated and signaling can be performed up to 4095. The length of the corresponding PPDU may be indicated by a combination of the L_LENGTH field and an L_RATE field. In this case, a legacy terminal and a non-legacy terminal may interpret the L_LENGTH field in different methods.

First, a method for interpreting the length of the corresponding PPDU by the legacy terminal or the non-legacy terminal by using the L_LENGTH field is as follows. When a value of the L_RATE field is configured to indicate 6 Mbps, three bytes (i.e., 24 bits) may be transmitted during 4 us corresponding to a 64 FFT symbol duration. Accordingly, the number of 64 FFT reference symbols after the L-SIG is acquired by adding three bytes corresponding to the SVC field and the tail field to the value of the L_LENGTH field and then dividing the same by three bytes corresponding to a transmission amount of one symbol. The length of the corresponding PPDU, i.e., a reception time (RXTIME) is acquired by multiplying the acquired number of symbols by 4 us corresponding to one symbol duration and then adding 20 us corresponding to a time required to transmit the L-STF, the L-LTF, and the L-SIG. This is represented as shown in equation 1 below.

$$RXTIME(\text{us}) = \left(\left\lceil \frac{L\_LENGTH + 3}{3} \right\rceil\right) \times 4 + 20 \quad \text{[Equation 1]}$$

In this case, $\lceil x \rceil$ denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$L\_LENGTH(\text{byte}) = \left(\left\lceil \frac{TXTIME - 20}{4} \right\rceil\right) \times 3 - 3 \quad \text{[Equation 2]}$$

Herein, TXTIME is the total transmission time constituting the corresponding PPDU, and is expressed by Equation 3 below. In this case, TX represents the transmission time of X.

$$TXTIME(us) = T_{L\text{-}STF} + T_{L\text{-}LTF} + T_{L\text{-}SIG} + T_{RL\text{-}SIG} + T_{U\text{-}SIG} + (T_{EHT\text{-}SIG\text{-}A}) + (T_{EHT\text{-}SIG\text{-}B}) + T_{EHT\text{-}STF} + N_{EHT\text{-}LTF} \cdot T_{EHT\text{-}LTF} + T_{DATA} \quad \text{[Equation 3]}$$

Referring to the above equations, the length of the PPDU is calculated based on a rounded up value of L_LENGTH/3. Therefore, for a random value of k, three different values of L_LENGTH={3k+1, 3k+2, 3(k+1)} indicate the same PPDU length.

Referring to FIG. 7(e), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHZ sub-channel, so that if puncturing is performed for BW having a large number of 20 MHz sub-channels, such as 80, 160, and 320 MHZ, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating 15 bits to signal a discontinuous channel type of single user transmission may act as excessively large signaling overhead in consideration of a low transmission rate of a signaling part.

The present invention proposes a technique for signaling a discontinuous channel type of an SU PPDU, and illustrates a discontinuous channel type determined according to the proposed technique. The present invention also proposes a technique for signaling each of puncturing types of primary 160 MHz and secondary 160 MHZ in a 320 MHz BW configuration of an SU PPDU.

An embodiment of the present invention proposes a technique for differently configuring a PPDU indicated by preamble puncturing BW values according to a PPDU format signaled in a PPDU format field. It is assumed that a BW field is 4 bits, and in a case of an EHT SU PPDU or a TB PPDU, EHT-SIG-A of 1 symbol may be additionally signaled after U-SIG, or EHT-SIG-A may not be signaled at all, so that, in consideration of this, it is necessary to completely signal up to 11 puncturing modes via only the BW field of U-SIG. However, in a case of an EHT MU PPDU, EHT-SIG-B is additionally signaled after U-SIG, so that up to 11 puncturing modes may be signaled in a method different from that of the SU PPDU. In a case of an EHT ER PPDU, a BW field may be configured to 1 bit to signal whether the EHT ER PPDU is a PPDU using a 20 MHz or 10 MHz band.

FIG. 7(f) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

Figure 8:
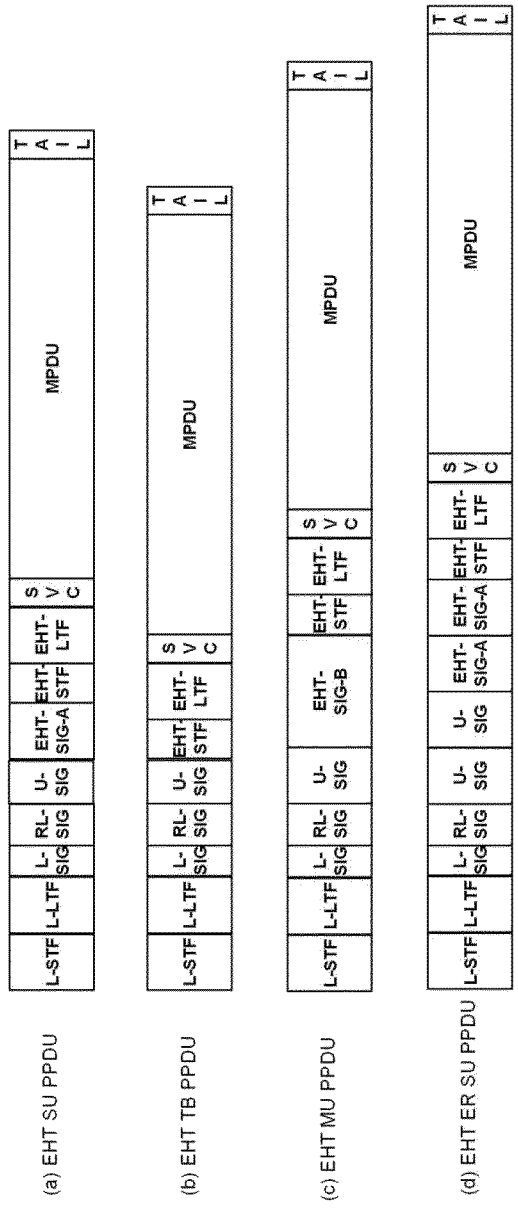
FIG. 8 illustrates an example of various extremely high throughput (EHT) physical protocol data unit (PPDU) formats and a method for indicating the same according to an embodiment of the present invention.

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(a) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(b) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(c) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

FIG. 8(d) shows an example of an EHT ER SU PPDU format used for single user transmission with an STA in an extended range. An EHT ER SU PPDU may be used for single user transmission with an STA of a wider range compared to the EHT SU PPDU described in FIG. 8(a), and a U-SIG field may be repeatedly located on a time axis.

The EHT MU PPDU described in FIG. 8(c) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

Two or more PPDUs illustrated in FIG. 8 may be indicated by a value indicating the same PPDU format. That is, two or more PPDUs may be indicated by the same PPDU frame by using the same value. For example, the EHT SU PPDU and the EHT MU PPDU may be indicated by the same value through the U-SIG PPDU format subfield. In this case, the EHT SUP PPDU and the EHT MU PPDU may be distinguished by the number of STAs receiving PPDUs. For example, a PPDU receiving only one STA may be identified as the EHT SU PPDU, and when the number of STAs is configured so that two or more STAs are received, the PPDU may be indicated as the EHT MU PPDU. In other words, values of the two or more PPDUs illustrated in FIG. 8 may be indicated through the same subfield value.

In addition, among the fields illustrated in FIG. 8, a part of the fields or part of information of the field may be omitted, and such a case where a part of the fields or part of information of the field is omitted may be defined as a compression mode or a compressed mode.

Figure 9:
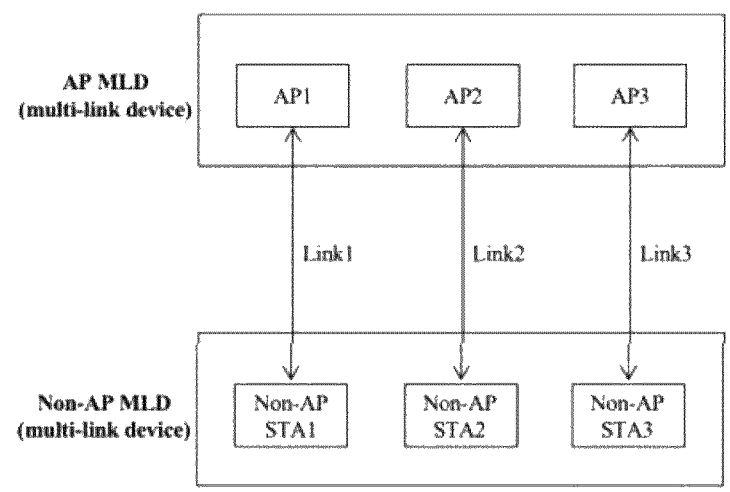
FIG. 9 illustrates a multi-link device according to an embodiment of the present invention.

FIG. 9 illustrates a multi-link device according to an embodiment of the present invention.

Referring to FIG. 9, the concept of a device affiliated with one or more STAs may be defined. As another embodiment, according to an embodiment of the present invention, devices affiliated with more than one STA (i.e., two or more STAs) may be defined. In this case, the device may be a logical concept. Accordingly, the devices having such a concept and affiliated with one or more STAs or more than one STA may be referred to as a multi-link device (MLD), a multi-band device, or a multi-link logical entity (MLLE).

Alternatively, the devices having such a concept may be referred to as a multi-link entity (MLE). In addition, an MLD may have a medium access control service access point (MAC SAP) up to a logical link control (LLC) layer, and the MLD may have a MAC data service.

STAs included in the MLD may operate in one or more links or channels. That is, the STAs included in the MLD may operate in multiple different channels. For example, the STAs included in the MLD may operate by using channels in different frequency bands such as 2.4 GHz, 5 GHZ, and 6 GHz. Accordingly, the MLD may acquire a gain in channel access, and increase performance of the entire network. The convention wireless LAN operates in a single link, but through MLD operation, more channel access opportunities may be acquired by using multiple links, or an STA may efficiently operate in multiple links in consideration of a channel condition.

In addition, when the STAs affiliated with the MLD correspond to an AP, the MLD affiliated with the APs may be an AP MLD. However, when the STAs affiliated with the MLD is a non-AP STA, the MLD affiliated with the non-APs may be a non-AP MLD.

In addition, an AP MLD may be a device including one or more wireless access points, and may be a device connected to a higher layer through one interface. That is, the AP MLD may be connected to a logical link control (LLC) layer through one interface. Multiple APs included in the AP MLD may share some functions in a MAC layer. Each AP in the AP MLD may operate in different links. The STA MLD may be a device including one or more non-AP STAs, and may be a device connected to a higher layer through one interface.

That is, the STA MLD may be connected to an LLC layer through one interface. Multiple STAs included in the STA MLD may share some functions in the MAC layer. In addition, the STA MLD may be referred to as a non-AP MLD. In this case, the AP MLD and the STA MLD may operate a multi-link operation performing communication by using multiple individual links. That is, when the AP MLD includes multiple APs, each of the APs may configure a separate link and operate a frame transmission or reception operation with each terminal included the STA MLD by using multiple links. In this case, each link may operate in 2.4 GHZ, 5 GHZ, or a 6 GHz band, and a bandwidth extension operation may be performed in each link. For example, when the AP MLD configures one link in the 2.4 GHz band and two links in the 5 GHz band, in the 2.4 GHz band, frame transmission may be performed with a 40 MHz through the bandwidth extension scheme, and in each link using the 5 GHZ band, frame transmission may be performed with the maximum 320 MHz bandwidth by utilizing inconsecutive bandwidths.

With respect to the AP MLD or the STA MLD, while one terminal in the MLD performs a transmission operation due to an interference problem in the device, another terminal may fail to perform a reception operation. An operation in which one AP or terminal in an MLD performs a transmission operation while another AP or a terminal in the MLD performs a reception operation may be referred to as simultaneous transmission and reception (STR). The AP MLD may perform an STR operation for all links. Alternatively, in some links of the AP MLD, the STR operation may not be performed. A terminal MLD capable of performing the STR operation may be associated with the AP MLD, and an MLD not capable of performing the STR operation for some or all links may be associated with the AP MLD. In addition, a terminal (for example, IEEE 802.11a/b/g/n/ac/ax terminal) not belonging to the MLD may be additionally associated with the AP included in the AP MLD.

The AP MLD and the STA MLD may perform a negotiation process for a multi-link usage operation during the scanning and associated processes described in FIG. 5 above. For example, in the scanning process described in FIG. 5, the AP included in the AP MLD may transmit a beacon frame including an indicator indicating that a multi-link operation is available, the number of available links, and information on multiple available links. Alternatively, the terminal belonging to the STA MLD may transmit a probe request frame including an indicator indicating that a multi-link operation is available, and an AP belonging to the AP MLD may transmit a probe response frame including an indicator indicating that a multi-link operation is available. In this case, the AP may additionally include the number of available links in the multi-link operation, link information, and the like, and transmit the same.

In the scanning process, the STA MLD having identified whether the multi-link operation of the AP MLD is performed and the available link information may perform the association process with the AP MLD. In this case, the AP MLD and the STA MLD may start a negotiation process for the multi-link operation. In this case, the negotiation operation for the multi-link operation may be performed in the association process between the AP belonging to the AP MLD and the terminal belonging to the STA MLD. That is, while transmitting an association request frame to an AP (for example, AP1) belonging to the AP MLD, a terminal (for example, STA1) belonging to the STA MLD may transmit an indicator indicating that the multi-link operation of the terminal is available and a request indicator for requesting performing of the multi-link operation. The AP having received the association request frame from the terminal may identify an indicator for requesting the multi-link operation, and when the AP may perform the multi-link operation, the AP may transmit, to the corresponding terminal, an association response frame including link information such as a link to be used for the multi-link operation and a parameter used in each link, and allowing the multi-link operation. The parameter for the multi-link operation may include one or more of a band of each link to be used, a bandwidth extension direction, a target beacon transmission time (TBTT), and whether the STR operation is performed. The AP MLD and the STA MLD, for which the use of the multi-link operation is identified through exchanging of the association request frame and the response frame, may perform a frame transmission operation using multiple links by using serval terminals included in the STA MLD and several APs included in the AP MLD after the corresponding association process.

Referring to FIG. 9, there may be an MLD including multiple STAs, and the multiple STAs included in the MLD may operate in multiple links. In FIG. 9, the MLD including AP1, AP2, and AP3 corresponding APs, may be referred to as an AP MLD, and an MLD including non-AP STA1, non-AP STA2, and non-AP STA3 corresponding to non-AP STAs, may be referred to as a non-AP MLD. STAs included in the MLD may operate in link 1 (Link1), link 2 (Link2), link 3 (Link3), or some of links 1 to 3.

According to an embodiment of the present invention, the multi-link operation may include a multi-link setup operation. The multi-link setup operation may be an operation corresponding to an association performed in a single-link operation. For exchanging frames in the multiple links, a multi-link setup needs to be performed first. The multi-link setup operation may be performed by using a multi-link setup element. Here, the multi-link setup element may include capability information related to the multiple links, and the capability information may include information related to whether an STA included in the MLD receives a frame receives a frame through one link while another STA included in the MLD transmits a frame through another link. That is, the capability information may include information related to whether STAs (non-AP STAs) and/or APs (or AP STAs) can simultaneously transmit/receive a frame in different transmission directions through links included in the MLD. In addition, the capability information may further include information related to an available link or an operating channel. The multi-link setup may be configured through a negotiation between peer STAs, and the multi-link operation may be configured through one link.

According to an embodiment of the present invention, there may be a mapping relationship between a TID and a link of the MLD. For example, when the TID and the link are mapped to each other, the TID may be transmitted through the mapped link. The mapping between the TID and the link may be directional-based mapping. For example, the mapping may be performed for each of both directions between MLD1 and MLD2. In addition, in the mapping between the TID and the link, there may be a default setup. For example, the mapping between the TID and the link may normally indicate mapping between a link and all TIDS.

Figure 10:
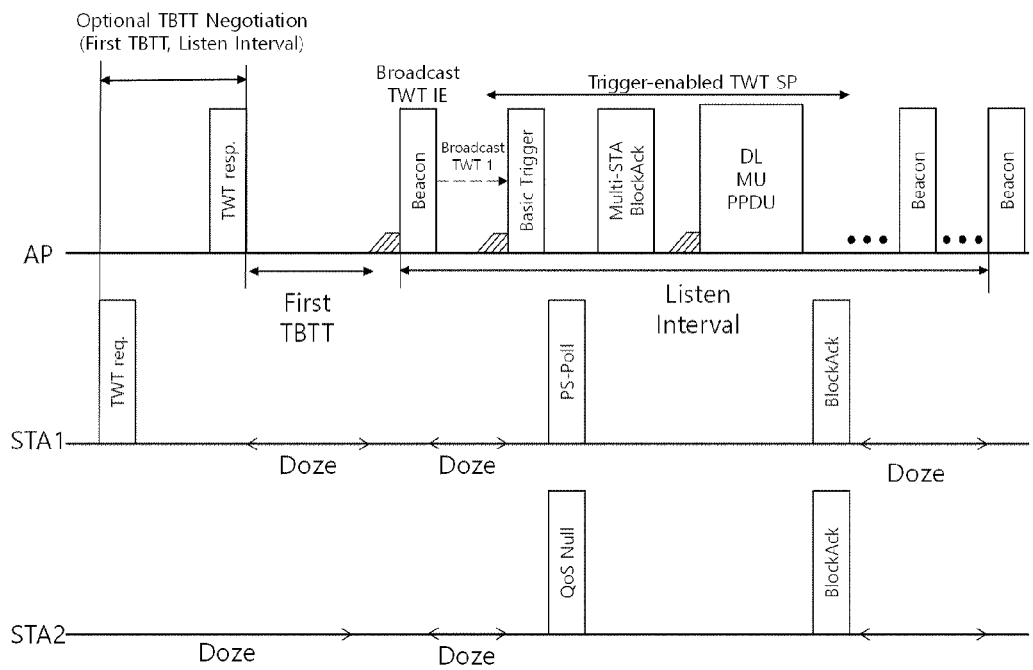
FIG. 10 illustrates a method of configuring a broadcast TWT between an AP and a station according to an embodiment of the present invention.

FIG. 10 illustrates a method of configuring a broadcast TWT between an AP and a station according to an embodiment of the present invention.

A service period in the TWT may be configured as follows. The AP requests to participate in the TWT from a station associated with the AP. The station may participate in a broadcast TWT, or may negotiate with the AP about an individual TWT. In this case, the AP may configure a value of a TWT required subfield of an HE operation element as 1 so as to request the station to participate in the TWT. In addition, the AP may transmit a broadcast TWT element through a management frame, for example, a beacon frame, to transfer information required for participation in the broadcast TWT to the station. In this case, the AP may configure dot11TWTOptionActivated to be "true" and a broadcast TWT support field (element) of an HE capabilities element to be 1 to signaling that the broadcast TWT is supported. The AP may configure a restricted service period to be similar to a service period of a TWT.

In an embodiment of FIG. 10, a first station (STA 1) requests a TWT configuration from the AP. The AP and the first station (STA 1) configure a TWT parameter, for example, an initial TBTT and a listen interval. Accordingly, a broadcast TWT is configured among the AP, the first station (STA 1), and a second station (STA 2). The AP indicates a broadcast TWT service period by using the beacon frame. In the broadcast TWT service period, the AP may transmit a downlink (DL) physical layer protocol data unit (PPDU) to the first station (STA 1) and the second station (STA 2) or transmit a trigger frame to the first station (STA 1) and the second station (STA 2) to trigger uplink (UL) transmission. In the broadcast TWT service period, the first station (STA 1) and the second station (STA 2) wake up to receive the beacon frame. The first station (STA 1) and the second station (STA 2) acquire information on a TWT from the received beacon frame. The AP transmits the trigger frame to the first station (STA 1) and the second station (STA 2), the first station (STA 1) transmits a PS-poll frame to the AP, and the second station (STA 2) transmits a QoS null frame to the AP. The AP receive the PS-poll frame and the QoS null frame transmitted by the first station (STA 1) and the second station (STA 2), and determines that the first station (STA 1) and the second station (STA 2) are in an awake state. The AP transmits a multi-STA block ACK frame to the first station (STA 1) and the second station (STA 2). The AP transmits a DL PPDU to the first station (STA 1) and the second station (STA 2).

Performing channel access or transmission by a station not participating in a TWT is not restricted in the conventional TWT service period. This is because the TWT is to help a station participating in the TWT to enter a doze state. However, a restricted service period for preventing a transmission delay of low-latency traffic needs to guarantee prioritized transmission of low traffic, and thus a method for protecting the restricted service period is required.

During a restricted service period, channel access by a station not participating in a restricted TWT may be restricted. Specifically, during the restricted service period, the station not participating in the restricted TWT may fail to perform channel access. When the station not participating in the restricted TWT completes channel access during the restricted service period, the corresponding station may not perform transmission and restart a channel access procedure. In this case, the station may restart the channel access procedure when the restricted service period ends. That is, restarting channel access during the restricted service period may mean an operation of suspending transmission such as restarting channel access by reselecting a backoff counter, and may mean re-attempting channel access since the channel access is allowed again when the restricted service period ends.

In addition, the channel access of the station may indicate an EDCA backoff procedure. When the channel access is completed, it may indicate that a backoff counter of an EDCA backoff procedure has reached 0. In addition, when the station restarts the channel access procedure, the station may randomly acquire an integer within a CW used for immediately preceding channel access, and use the acquired integer as a backoff counter. That is, the station may not double the size of the CW used for the immediately preceding channel access. In this case, the CW may be maintained for each AC. Such channel access restriction may be applied only to a station supporting the restricted TWT. Specifically, such channel access restriction may be applied only to a station having dot11RestrictedTWTOptionImplemented of an EHT Capabilities element configured as "true" among non-legacy (EHT) stations, and may not be applied to a station having dot11RestrictedTWTOptionImplemented of the EHT Capabilities element as "false" among the non-legacy (EHT) stations. In the present specification, a non-legacy station may indicate an EHT station and a station after the EHT station. In addition, the legacy station corresponds to a station before the EHT station, and may indicate a non-HT station, an HT station, a VHT station, and an HE station.

In addition, during the restricted service period, an NAV may be configured in traffic other than low-latency traffic for the non-legacy station. Specifically, like the NAV is configured in traffic other than low-latency traffic, the station may suspend a channel access procedure for transmission of traffic other than low-latency traffic. In such an embodiment, the NAV may be an NAV that is independent from the conventional NAV (basic NAV or intra-BSS NAV). In this case, the non-legacy station may be limited to a station supporting a restricted TWT. In another specific embodiment, the non-legacy station may be limited to a station participating in the restricted TWT.

The restricted service period may be included in a broadcast TWT service period. In another specific embodiment, the restricted service period may not be included in the broadcast TWT service period.

In addition, the restricted service period may repeat by a cycle designated by the AP. That is, the AP may designate a repetition cycle of the restricted service period. Accordingly, the AP may not transmit a TWT element of a beacon frame every time to configure a restricted service period. In this case, the cycle of the service period may be configured according to characteristics of the low-latency service using low-latency traffic. For example, the cycle of the low-latency service period, by which low-latency traffic is generated at each 50 ms, may be 50 ms.

In addition, a quiet interval may be configured for a station not supporting the restricted TWT. In the conventional wireless LAN, the quiet interval corresponds to an interval for supporting channel sensing. When the quiet interval is configured, all station suspend transmission. The restricted service period can be protected using characteristics of the quiet interval. This will be described through FIG. 11. In this case, the station not supporting the restricted TWT may be limited to a legacy station.

FIG. 11 illustrates configuring a quiet interval by an AP according to an embodiment of the present invention.

An AP operating a restricted TWT may transmit a quiet element to configure a quiet interval. A station suspends channel access during the quiet interval. However, when channel access of a station participating in the restricted TWT is also restricted, low-latency traffic transmission cannot be performed. Accordingly, the station participating in the restricted TWT may ignore a quiet interval corresponding to a restricted service period. In this case, the quiet interval corresponding to the restricted service period indicates a quiet interval configured to protect the restricted service period of the restricted TWT. Specifically, the station participating in the restricted TWT may consider the quiet interval corresponding to the restricted service period as a restricted service period. The AP operating the restricted TWT may not configure the quiet interval to be matched to the restricted service period. This is because the quiet interval of the quiet element is configured in units of time units (TUs) (1024 us) and the TWT is configured in units of 256 us.

However, when channel access is performed in a quiet interval other than the quiet interval not configured for the restricted service period, the quiet interval not configured for the restricted service period may be interrupted. Accordingly, a quiet interval configured for the restricted service period, that is, a quiet interval corresponding to the restricted service period, needs to be distinguished. Accordingly, the station participating in the restricted TWT may not ignore the quiet interval not corresponding the restricted service period. The station cannot perform all transmissions in the quiet interval not corresponding to the restricted service period. Specifically, the station participating in the restricted TWT may not ignore a quiet interval not overlapping with the restricted service period. In a specific embodiment, the station participating in the restricted TWT may perform all transmissions in the quiet interval not overlapping with the restricted service period.

In addition, in the above-described embodiments, when a start time point of the restricted service period and a start time of the quiet interval are within a pre-designated time and a start time point and the service period and a start time point of the quiet interval are within a pre-designated time, the station participating in the restricted TWT may consider the quiet interval as a quiet interval corresponding to the restricted service period. As described above, this is because the AP operating the restricted TWT may not configure the quiet interval to be matched to the restricted service period.

In an embodiment of FIG. 11, the AP transmits a beacon frame to configure a quiet interval and a restricted service period. In FIG. 11(a), the quiet interval is configured as a time interval identical to the restricted service period. Accordingly, the station participating in the restricted TWT in the quiet interval performs channel access. In FIG. 11(b), the quiet interval is configured as an interval from a time point earlier than a start point of the restricted service period to a time point later than an end time point of the restricted service period. In FIG. 11(b), channel access of the station participating in the restricted TWT is restricted in the quiet interval not overlapping with the restricted service period. The station participating in the restricted TWT performs channel access in the quiet interval overlapping with the restricted service period.

As described above, channel access may be restricted during the restricted service period. Accordingly, such restriction may be also applied to a TXOP configuration. This will be described through FIG. 12.

FIG. 12 illustrates a method of configuring a TXOP in consideration of a restricted service period by a station according to an embodiment of the present invention.

A station having acquired a TXOP before a restricted service period is started, that is, a station corresponding to a TXOP holder, may need to terminate the TXOP before the restricted service period. This is because even when the restricted service period is started, transmission of low-latency traffic may be interrupted if frame exchange of the TXOP holder is continued. In this case, the station may be a non-legacy station. In another specific embodiment, the station may be limited to a station supporting a restricted TWT. That is, such restriction may not be applied to the station having configured a value of a field of dot11RestrictedTWTOptionImplemented as false.

In a specific embodiment, when the station corresponding to the TXOP holder transmits low-latency traffic, frame exchange may be continued even after the restricted service period is started.

A specific method of terminating a TXOP before a restricted service period by a station is described.

The station may configure the TXOP on the basis of the restricted service period. Specifically, the station may configure an end time point of the TXOP to be before the station of the restricted service period. In this case, the station may configure, to be before the restricted service period, a duration of an initiating frame for initiating a frame exchange sequence. For example, if a time point at which the station successfully performs channel access is 3 m before the start of the restricted service period, the station may configure the TXOP to be 3 ms before. In addition, the station may transmit a CTS-to-self frame to terminate the TXOP. In this case, the station may transmit the CTS-to-self frame at a basic transmission speed, 6 Mbps. This is because many legacy stations may receive frames when the stations transmit frames at the basic transmission speed.

In another specific embodiment, the station may transmit a CF-end frame before the start of the restricted service period. Accordingly, the station may terminate the TXOP before the start of the restricted service period. In this case, the station may transmit the CF-end frame at the basic transmission speed, 6 Mbps. This is because many legacy stations may receive frames when the stations transmit frames at the basic transmission speed.

In addition, the station not corresponding to the TXOP holder may release, at a restricted service period start time point, an NAV configured before the start of the restricted service period. In this case, the station may be a station supporting the restricted TWT. That is, the station may be a station having a value of a field of dot11RestrictedTWTOptionImplemented configured as true. The station which does not correspond to the TXOP holder but does not support the restricted TWT cannot release, at the restricted service period start time point, the NAV configured before the start of the restricted service period. However, when a duration of the TXOP, remaining after the station completes frame exchange is less than a double of a sum of an SIFS and a time required for transmission of the CF-end frame, the station may not transmit the CF-end frame. In this case, the station may configure that the TXOP is released at the restricted service period time point. Specifically, the station may consider that a basic NAV is released at the restricted service period start time point.

In another specific embodiment, the station may be limited to a station participating in the restricted TWT.

In an embodiment of FIG. 12, the AP transmits a beacon frame including a TWT element to signal that the restricted service period is configured. In an embodiment of FIG. 12($a$), the station transmits an RTS frame to configure a TXOP. In this case, the station configures a value of a duration field of the RTS frame to be before the restricted service period. The station performs frame exchange with the AP, and completes the frame exchange before the start of the restricted service period. In this case, the station lastly transmits a CTS-to-self frame. In an embodiment of FIG. 12($b$), the station transmits an RTS frame to configure the TXOP. In this case, the station configures a value of a duration field of the RTS frame without considering the restricted service period. The station performs frame exchange with the AP and completes the frame exchange before the start of the restricted service period. In this case, the station releases the TXOP by lastly transmitting the CF-end frame.

In the conventional wireless LAN operation, an operation in which transmission can be performed exceeding a TXOP limit is defined, as an exception to a TXOP rule. For example, retransmission of a single MPDU, single MSDU transmission under a block ack agreement (not included in an A-MSDU and an A-MPDU including two or more MPDUs), and transmission of a control frame and a QoS null frame (not included in the A-MPDU including two or more MPDUs) may be performed exceeding the TXOP limit. If such an exception is acknowledged also for the restricted service period, transmission of low-latency traffic may be delayed. Such a TXOP limit exception cannot be applied while the restricted service period is invaded.

When the end time point of the TXOP and the start time point of the restricted service period are within a pre-designated time difference, the station may determine that the TXOP is a TXOP acquired before the start of the restricted service period. The pre-designated time may be 100 us. In another specific embodiment, if the end time point of the TXOP is within the restricted service period, the station may determine that the TXOP is a TXOP acquired before the start of the restricted service period.

As described above, the station may need to terminal frame exchange before the restricted service period. Accordingly, the station may not allow the start of the frame exchange if the end time point of the frame exchange is within the restricted service period. In this case, the station may perform fragmentation to complete the frame exchange before the restricted service period.

In addition, when low-latency traffic is transmitted in the frame exchanged performed by the station corresponding to the TXOP holder, the station may continue to perform the frame exchange even after the start of low-latency service period.

A channel access channel in consideration of a restricted service period will be described through FIG. 13.

Figure 13:
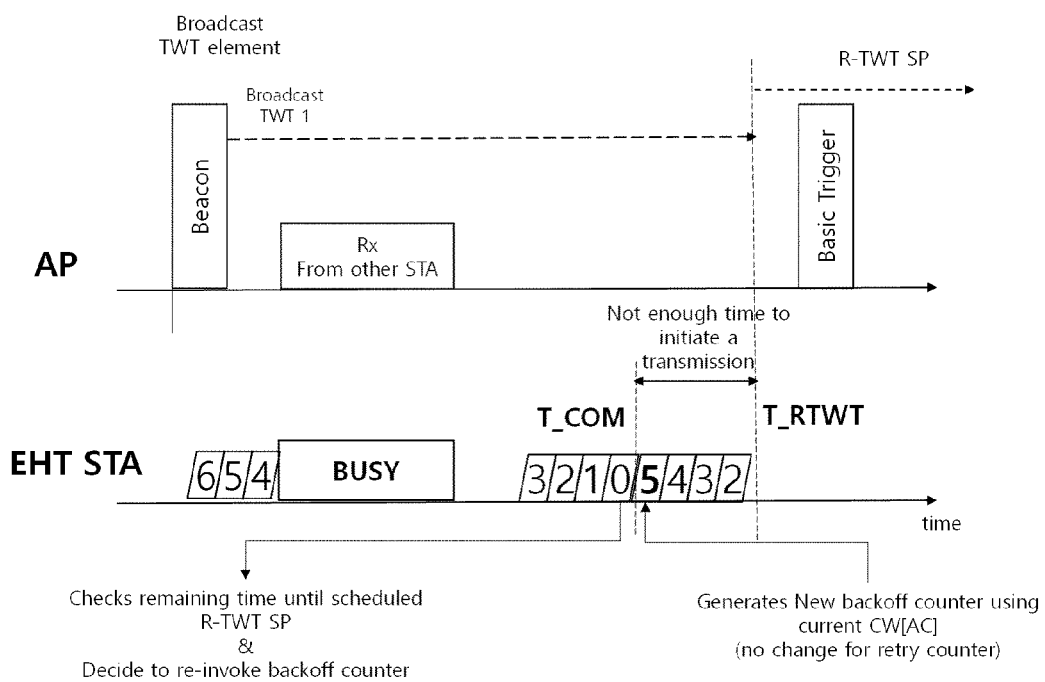
FIG. 13 illustrates re-performing a channel access procedure in consideration of a restricted service period by a station according to an embodiment of the present invention.

FIG. 13 illustrates re-performing a channel access procedure in consideration of a restricted service period by a station according to an embodiment of the present invention.

As described above, even though a station completes channel access before a restricted service period, if a frame exchange completion time point is after a start of the restricted service period, the station may restart a channel access procedure without performing transmission. In this case, the station may acquire again a value of a backoff counter. In this case, the station may use the size of a CW used in an immediately preceding channel access procedure. That is, the station may not double the size of the CW used in the immediately preceding channel access procedure, and may not initialize a minimum value among values of the CW. In addition, the station may not increase a retry count, for example, a QoS STA retry counter (QSRC).

In addition, if a time point at which the station has completed channel access is within a pre-designated time from a restricted service period start time point, the station may restart the channel access procedure without performing transmission.

In the embodiments above, the station attempting to transmit low-latency traffic may start frame exchange after channel access completion even when the frame exchange completion time point is after the start of the restricted service period. In such an exception may be allowed only when the station attempting to transmit the low-latency traffic corresponds to a station participating in a restricted TWT.

In addition, as described above, the station may operate as if an NAV is configured for an AC of traffic other than the low-latency traffic. Accordingly, the station may determine that a CCA result for transmission of the AC of the traffic other than the low-latency traffic is busy.

In an embodiment of FIG. 13, an AP transmits a beacon frame including a TWT element to signal that a restricted service period has been configured. A value of a backoff counter of channel access of the station reaches 0 before the start of the restricted service period. The station determines that a time point of completion of a frame including traffic to be transmitted is after a service period start time point. Accordingly, the station acquires a backoff counter within a CW value used in the immediately preceding channel access procedure. The station performs the channel access procedure again by using the acquired backoff counter. In this case, the station does not increase a retransmission counter.

All low-latency traffic transmissions may be completed before the completion of the restricted service period. In such a case, it may be inefficient if transmission of traffic other than the low-latency traffic is restricted due to the low-latency service period. Accordingly, a method of terminating the restricted service period early may be required. This will be described through an embodiment of FIG. 14.

Figure 14:
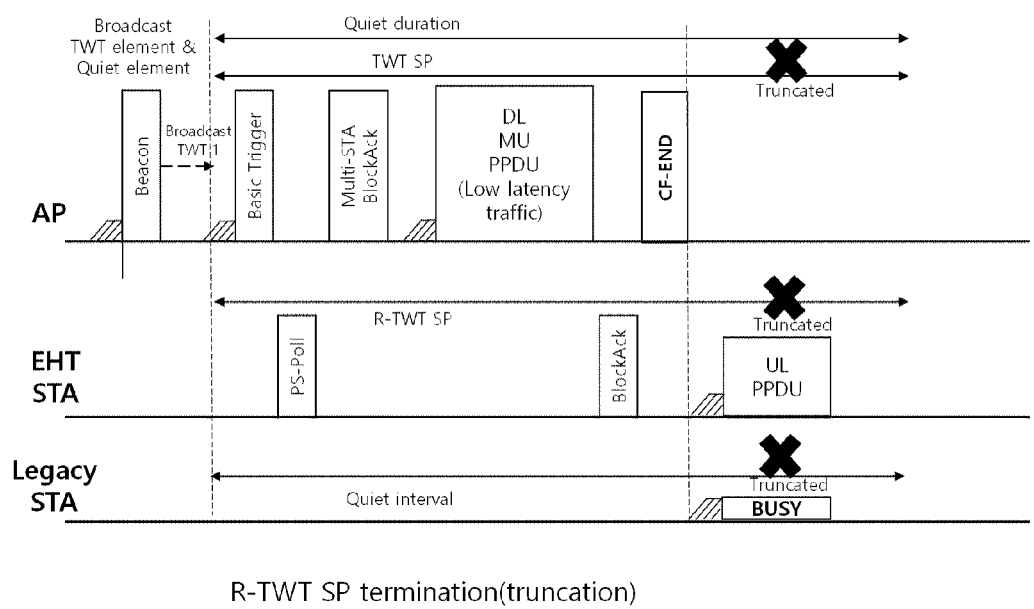
FIG. 14 illustrates an operation of terminating a restricted service period early by an AP according to an embodiment of the present invention

FIG. 14 illustrates an operation of terminating a restricted service period early by an AP according to an embodiment of the present invention.

To terminate a restricted service period early, an AP may need to determine that all low-latency traffic transmissions of a station participating in a restricted TWT has been completed. To this end, the station participating in the restricted TWT may signal whether to transmit low-latency traffic in addition to a transmitted frame. Specifically, the station may configure a value of a More Data subfield of a frame control field of a frame to signal to additionally transmit low-latency traffic. In this case, when the value of the More Data subfield of the frame control field of the frame transmitted in the restricted service period is 1, the More Data subfield may indicate that additional transmission of the low-latency traffic is required and may not indicate whether additional transmission of traffic other than the low-latency traffic is required. For example, when the station participating in the restricted TWT stores, in a transmission buffer, only traffic other than the low-latency traffic without storing the low-latency traffic, the station may configure the value of the More Data subfield of the frame control field of the transmitted by the station in the restricted service period as 0. The AP may terminate the restricted service period early on the basis of whether there is 0 as the value of the More Data subfield of the frame control field of the frame transmitted by the station participating in the restricted TWT in the restricted service period is 0. Specifically, when there is no low-latency traffic transmitted in the transmission buffer of the AP and there is no 0 as the value of the More Data subfield of the frame control field of the frame transmitted by the station participating in the restricted TWT in the restricted service period, the AP may terminate the restricted service early.

The AP may transmit a pre-designated control frame to terminate the restricted service period early. In this case, the control frame may be a CF-end frame. In this case, the AP may configure a BSSID (TA) field of the CF-end frame as a MAC address or a BSSID of the AP. In addition, the AP may configure an individual/group bit of the BSSID (TA) field of the CF-end frame as 1. In another specific embodiment, the AP may transmit a pre-designated management frame to terminate the restricted service period early.

The station having received a pre-designated frame indicating that the restricted service period is terminated within the restricted service period may determine that the restricted service period has been terminated. In this case, the station having received the pre-designated frame may resume channel access without a limitation applied to the restricted service period. As described above, the pre-designated frame may be a CF-end frame. In this case, when a value of a TA (BSSID) field of the CF-end frame received by the station in the restricted service period corresponds to a MAC address of an AP associated with the station, the station may determine the CF-end frame terminating the restricted service period.

As described above, to product the restricted service period from a legacy wireless communication terminal, a quiet interval for the restricted service period may be configured. In this case, the AP may transmit the CF-end frame to terminate the restricted service period. This is because the AP may also release the quiet interval configured for the legacy station when transmitting the CF-end frame.

In the above-described embodiments, the CF-end frame may have the type of the frame control field configured as a control frame (type value B3 B2=01), and have a subtype configured as a CF-end frame (subtype value B7 B6 B4 B4=1110).

When the quiet interval for the restricted service period is configured, the station participating in the restricted TWT may not allow to transmit the CF-end frame within the restricted service period. In a specific embodiment, the station participating in the restricted TWT may not allow to transmit the CF-end frame in the quiet interval corresponding to the restricted service period. This is because an NAV configured for the legacy station is released when the station participating in the restricted TWT transmits the CF-end frame. However, as described above, when the CF-end frame is used to terminate the restricted service period early, the AP may transmit the CF-end frame within the restricted service period.

In an embodiment of FIG. 14, the AP transmits a beacon frame including a TWT element and a quiet element. The station supporting the restricted TWT determines that the restricted service period is configured, and the station not supporting the restricted TWT determines that the quiet interval is configured. When the AP determines that all low-latency traffic transmissions have been completed within the restricted service period, the AP terminates the restricted service period early by transmitting the CF-end frame, and releases the quiet interval configured for the legacy station. In this case, the station supporting the restricted TWT determines that a channel access limit having been applied during the restricted service period has been lifted. Specifically, as described above, when an embodiment in which the NAV is configured during the restricted service period is applied, the station supporting the restricted TWT may determine that the NAV for the restricted service period has been released. In addition, the station not supporting the restricted TWT and having received the CF-end frame releases the NAV.

<TID Limit in Restricted TWT>

As described above, a TWT SP may be configured so that transmission of traffic having a specific condition is allowed and transmission of traffic having no specific condition is restricted by the AP. In this case, information (for example, information indicating a TID corresponding to traffic satisfying a specific condition, etc.) related to a TID corresponding to traffic having a specific condition is transmitted by the AP, and a non-AP STA may transmit or receive traffic corresponding to the TID transmitted from the AP within the TWT SP. In this case, the specific condition may be a condition (for example, low-latency traffic, etc.) related to a transmission delay of traffic, and transmission of traffic having the specific condition may be restricted. The restriction of transmission may mean that transmission is impossible during the TWT SP, or transmission is possible under a specific constraint (for example, aggregation with an MPDU of traffic corresponding to the TID satisfying the specific condition, aggregation with an MPDU of traffic corresponding to a TID satisfying a specific condition within a specific interval configured within the TWT SP, etc.), or channel access through EDCAF of the AC corresponding to TIDs not indicated from the AP is restricted.

Alternatively, the configured R-TWT SP may be re-configured in multiple intervals, only traffic for the TID corresponding to the traffic having the specific condition may be transmitted in at least one specific interval, and the traffic for the TID corresponding to the traffic having no specific condition may be allowed to be transmitted under a restricted condition (or a specific constraint) in an interval remaining after excluding at least one specific interval. For example, when the R-TWT SP includes a first interval and a second interval, only traffic for the TID corresponding to the traffic having the specific condition (for example, low-latency, etc.) may be transmitted in the first interval, and traffic for the TID corresponding to the traffic having no specific condition may be allowed to be transmitted under a restricted condition (or a specific constraint) in the second interval.

The information related to the TID may have each bit indicating a specific TID in the form of a bitmap, and may be included in a user information field including a trigger frame or information on each terminal of the trigger frame and transmitted.

For example, when a restricted TWT SP (hereinafter, referred to as R-TWT SP) which enables transmission of low-latency traffic only is configured, each of the STAs may be allowed to transmit low-latency traffic only within the R-TWT SP interval, and restricted to transmit traffic other than the low-latency traffic. In this case, the type of traffic which can be transmitted within a specific R-TWT SP by the STAs may be limited to traffic corresponding to the TIDs indicated from the AP. That is, in a process of configuring (setting up) the R-TWT SP, TIDs of traffic which can be transmitted during the corresponding R-TWT SP may be configured, and the configured TIDs may be notified to the STA. In this case, non-AP STAs may transmit only traffic corresponding to TIDs indicated from the AP within the corresponding R-TWT SP, and traffic corresponding to TIDs not indicated from the AP may be restricted to be transmitted.

Hereinafter, low-latency traffic may mean latency sensitive traffic, traffic which needs to satisfy a traffic transmission time to be within a predetermined time, or traffic having the traffic transmission time to which a specific condition is assigned.

The AP may indicate, through a TWT element transmitted to configure an R-TWT SP, information related to the TID which can be transmitted within the corresponding R-TWT SP. If the AP has indicated specific TIDs through the TWT element transmitted to establish a specific R-TWT SP, the AP and the STAs may transmit only traffic corresponding to the specific TIDs within the specific R-TWT SP. In this case, traffic corresponding to TIDs other than the specific TIDs may be restricted to be transmitted. In this case, traffic (MPDU, MSDU, etc.) corresponding to the other TIDs may be transmitted in the form of aggregation (for example, A-MPDU) through a PPDU through which frames corresponding to the specific TIDS are transmitted.

FIG. 15 illustrates an example of a target wake time (TWT) element for configuring a broadcast TWT service period (SP) according to an embodiment of the present invention.

Referring to FIG. 15, an AP may configure a specific interval as an R-TWT SP to allow transmission of only traffic having the above-described specific condition, and may transmit a TWT element to transmit information on the configured R-TWT SP.

Specifically, a broadcast TWT parameter set field may mean one or more parameter set fields included in a TWT parameter information field of the TWT element when a negotiation type subfield (of a control field) of the TWT element is indicated as a broadcast TWT.

Referring to FIG. 15(a), the broadcast TWT parameter set field may include a restricted TWT traffic info field. Information on TIDs to be considered as low-latency traffic in an R-TWT SP configured through the corresponding TWT element is indicated by the restricted TWT info field, and this will be described in more detail through an embodiment of FIG. 16 below. As such, the broadcast TWT parameter set field may have a configuring of including a restricted TWT traffic information field, or a configuration of not including the same. Accordingly, whether the corresponding broadcast TWT parameter set field includes the restricted TWT traffic information field needs to be indicated to the STA (AP or non-AP STA) having received the TWT element. That is, the TWT element needs to include information indicating that the configured TWT SP is an R-TWT SP corresponding to a TWT SP for traffic having a specific condition (for example, low-latency traffic) and/or information indicating whether a traffic information field related to the R-TWT SP is included.

Whether the corresponding broadcast TWT information field includes the restricted TWT traffic information field may be indicated through the broadcast TWT information field. More specifically, the broadcast TWT information field (see FIG. 15(b)) may include a restricted TWT traffic information present subfield. When the restricted TWT traffic information present subfield is indicated as 1, a broadcast TWT information field including the corresponding restricted TWT traffic information present subfield may have a configuration of including the restricted TWT traffic information field. On the other hand, when the restricted TWT traffic information present subfield is configured as 0, the broadcast TWT information field including the corresponding restricted TWT traffic information present subfield may have a configuration of not including the restricted TWT traffic information field. In this case, the restricted TWT traffic information present subfield may be included only in the broadcast TWT parameter set field transmitted to establish the R-TWT SP. That is, only the broadcast TWT parameter set field corresponding to the R-TWT may have a TWT traffic information present subfield configured as 1. In this case, an STA for transmitting the TWT element to establish the R-TWT SP may be an AP for scheduling the R-TWT SP.

FIG. 16 illustrates an example of a restricted TWT traffic information field for configuring a restricted TWT SP according to an embodiment of the present invention.

Referring to FIG. 16(a), a restricted TWT traffic information field may include a traffic information control field, a restricted TWT DL TID bitmap field, an a restricted TWT UL TID bitmap field. The traffic information control field (see FIG. 16(b)) may include a DL (UL) TID bitmap valid and a UL TID bitmap valid subfield. When the DL (UL) TID bitmap valid subfield is indicated as 0, it may means that the restricted TWT DL (UL) TID bitmap subfield is reserved and traffic corresponding to all TIDs is considered as low-latency traffic. That is, when the DL (UL) TID bitmap valid subfield is indicated as 0, a TID-related constraint is not applied to DL (UL) traffic transmitted within an R-TWT SP.

When the DL (UL) TID bitmap valid subfield is indicated as 1, only a TID corresponding to a bit indicated as 1 in the restricted TWT DL (UL) TID bitmap subfield may be considered as low-latency traffic. More specifically, the kth bit of the DL (UL) TID bitmap subfield is indicated as 1, DL (UL) traffic corresponding to DL (UL) TID k is considered as low-latency traffic, and when the n$^{th}$ bit is indicated as 0, it may be considered that traffic corresponding to TID n is not low-latency traffic. Accordingly, traffic of the TID corresponding to the bit configured as "1" in the DL (UL) TID bitmap subfield may be recognized as traffic having a specific condition, and may be transmitted within a configured R-TWT SP.

In this case, the restricted TWT DL/UL bitmap subfield may be included in the restricted TWT traffic information field only when the DL/UL bitmap valid subfield of the traffic information control field is indicated as 1. That is, the restricted TWT traffic information field having the DL TID bitmap valid subfield indicated as 0 may have a configuration of not including the restricted TWT DL TID bitmap subfield. In the following description and embodiments of the present invention, for convenience of description, a TID indicated to be considered as low-latency traffic refers to a low-latency TID.

In the restricted TWT traffic information field corresponding to a specific R-TWT SP, if the UL TID bitmap subfield is indicated as 1 and the restricted TWT UL TID bitmap subfield is indicated as 00001111, the specific R-TWT SP may be an R-TWT SP in which only TIDs 4 to 7 are indicated as low-latency TIDs in an UL direction. In this case, when scheduled STAs transmit UL traffic within the R-TWT SP, only traffic corresponding to TIDs 4 to 7 may need to be transmitted. In this case, transmission of traffic corresponding to TIDs (TIDs 0 to 3) remaining after excluding TIDs 4 to 7 may be restricted. In this case, when the transmission is restricted, it may mean that transmission (TXOP) cannot be initiated (acquired) through an EDCAF of an access category or access class (AC) corresponding to TIDs 0 to 3. A TID-related channel access limit is described in more detail through the following embodiments of the present invention.

As described above, a broadcast TWT parameter set field transmitted to establish an R-TWT SP has a configuration of including a restricted TWT traffic information present subfield as being considered in an embodiment of FIG. 15. In this case, the restricted TWT traffic information present subfield may be indicated (included) only when the corresponding broadcast TWT parameter set field is transmitted to establish the R-TWT SP. In other words, if the broadcast TWT parameter set field is not for establishing the R-TWT SP, the broadcast TWT parameter set may have a configuration not including the restricted TWT traffic information present subfield. That is, the restricted TWT traffic information present subfield illustrated in FIG. 15(b) may be reserved. As such, the broadcast TWT parameter set field transmitted to establish a broadcast TWT SP other than the R-TWT SP and the broadcast TWT parameter set field transmitted to establish the R-TWT SP may have different formats. Accordingly, an STA for receiving the broadcast TWT parameter set field needs to know whether or not the corresponding broadcast TWT parameter set field is transmitted to establish the R-TWT SP.

Accordingly, the STA for transmitting the broadcast TWT parameter set field to configure the R-TWT SP may indicate, through a request type field of a broadcast TWT parameter set field, whether the corresponding broadcast TWT parameter set field is for establishing the R-TWT SP. More specifically, the STA for transmitting the broadcast TWT parameter set field to establish the R-TWT SP may indicate that the corresponding broadcast TWT parameter set field has a format related to the R-TWT by configuring a broadcast TWT recommendation field value included in a request type field of the broadcast TWT parameter set field as a specific value (for example, 4).

In addition, the STA for transmitting the broadcast TWT parameter set field to establish the R-TWT SP may configure a value of a broadcast TWT recommendation field to indicate information related to a limit of a TID which can be transmitted within the R-TWT SP to be established.

A TWT element transmitted/received by 11ax STAs may include a broadcast TWT recommendation field. The broadcast TWT recommendation field is utilized to indicate restrictions related to characteristics of a broadcast TWT SP and the types of frames to be transmitted during a broadcast TWT SP to be established. A method of utilizing broadcast TWT recommendation field values 0 to 3 by 11ax STAs (AP and non-AP STA) is as follows.

When a value of the broadcast TWT recommendation field is configured as 0, it may be indicated/interpreted that the value means a broadcast TWT SP having no restriction for a frame to be transmitted.

When a value of the broadcast TWT recommendation field is configured as 1 or 2, a TWT scheduled STA may indicate/interpret that the value means a broadcast TWT SP recommended to request only a specific type of status or feedback.

When a value of the broadcast TWT recommendation field is configured as 3, it may be indicated/interpreted that the value means that there is no restriction for the frame to be transmitted but means a broadcast TWT SP in which the AP needs to transmit a FILS discovery frame including a TIM frame or a TIM element at each TWT SP start time point.

The R-TWT SP may be considered as a type of a broadcast TWT SP, and the R-TWT SP and whether a frame transmission restriction is applied to the R-TWT SP may be indicated through the value of the broadcast TWT recommendation field. In this case, in the method of applying the frame transmission restriction to the R-TWT SP, a TID of transmitted traffic may be limited to a specific TID. In this case, the specific TID may be a low-latency TID.

For example, when a value of the broadcast TWT recommendation field transmitted in relation to a specific R-TWT SP is indicated as a specific value (for example, 5), the specific R-TWT SP may be restricted to allow transmission of a low-latency TID only. In this case, an MPDU of a TID other than the low-latency TID may not be allowed to be transmitted even when being aggregated with low-latency traffic. That is, when the value of the broadcast TWT recommendation field is configured as a specific value, for the TID not indicated as the low-latency TID, not only channel access through the corresponding EDCAF is restricted but also it may be restricted to be aggregated together with the low-latency traffic, and thus it may be impossible to be transmitted within the R-TWT SP. That is, when the value of the broadcast TWT recommendation field is configured as a specific value, an MPDU not corresponding to the low-latency TID cannot be transmitted within the R-TWT SP. This may be understood that not only a constraint to the EDCAF (of the AC) not corresponding to the low-latency TID but also an MPDU transmission (or MPDU aggregation) restriction are applied together. In the present invention, the corresponding R-TWT SP is called a TID-restricted-TWT (TID-R-TWT) SP.

When the value of the broadcast TWT recommendation field is indicated as a specific value, a restricted TWT traffic information preset subfield and DL/UL TID bitmap valid subfields (or at least one subfield) may need to be always configured as 1. This is because a transmission restriction to traffic of a TID other than the low-latency TID is applicable only when the low-latency TID is specified.

In another example, when the value of the broadcast TWT recommendation field transmitted in relation to a specific R-TWT SP is indicated as another specific value (for example, 4), the specific R-TWT SP may be restricted so that the low-latency TID is prioritized to be transmitted. That is, in the configured R-TWT SP, traffic having a specific condition (for example, low-latency) may be prioritized over other traffic and transmitted, and the other traffic may be transmitted under a restricted condition.

For example, the restricted condition may mean that transmission is not allowed, transmission through aggregation with traffic having a specific condition is allowed, or transmission through aggregation with traffic having a specific condition or sole transmission is allowed only in a specific interval of the R-TWT SP. Alternatively, traffic (frame, MPDU, packet, etc.) other than the low-latency TID can be transmitted in the R-TWT SP only when there is no more traffic of the low-latency TID to be transmitted. For example, the EDCAF corresponding to TIDs other than the low-latency TID may be restricted to perform channel access only when a transmission queue of the AC corresponding to the low-latency TIDs are in an empty state. In another example, a frame (MPDU) corresponding a TID other than the low-latency TID may be restricted to be aggregated with an A-MPDU of low-latency traffic only when the transmission queue of the AC corresponding to the low-latency TID is in an empty state. That is, a case where an MPDU of a TID other than the low-latency TID is included in a multi-TID A-MPDU may be limited to a case where there are no more frames for the low-latency TIDs.

In another example, whether only a low-latency TID is allowed or traffic other than the low-latency TID is also restrictively allowed to be transmitted in a specific R-TWT SP may be implicitly indicated/determined. More specifically, whether only the low-latency TID is allowed to be transmitted within the specific R-TWT SP may be indicated/determined through whether a duration of the R-TWT SP exceeds a specific length.

In this case, when the length of the R-TWT SP is shorter than a specific value (a pre-promised value), the R-TWT SP may be indicated/determined to be an R-TWT-SP in which only a frame of the low-latency TID is transmitted. Accordingly, a non-AP STA corresponding to a member of an R-TWT SP having the length shorter than (equal to or smaller than, or smaller than) a specific value needs to transmit only a frame of the low-latency TID within the corresponding R-TWT SP.

On the other hand, a non-AP STA corresponding to a member of an R-TWT SP having the length longer than (equal to or greater than, or greater than) a specific value may transmit a TID frame other than the low-latency TID after transmitting the frame of the low-latency TID first within the corresponding R-TWT SP.

In this case, a non-AP STA corresponding to a member of an R-TWT SP having the length longer than a specific value (for example, 1 TU) may need to transmit only a frame of a low-latency TID until an elapsed time of the corresponding R-TWT SP reaches the specific value, and may need to transmit a frame of a TID other than the low-latency TID during a remaining R-TWT SP if the elapsed time of the R-TWT SP exceeds the specific value.

That is, an operation method of an R-TWT SP may be determined/indicated/changed according to the length of the R-TWT SP. As such, when different operation methods are applied to a single R-TWT SP for each time interval (that is, there are an interval in which only a frame of a low-latency TID is allowed to be transmitted and an interval in which a frame of a TID other than the low-latency TID is also allowed to be transmitted), a broadcast TWT recommendation field of a TWT element transmitted when the R-TWT SP is established may be configured as a specific value.

If a specific R-TWT SP is established while a broadcast TWT recommendation field is indicated as a specific value and another R-TWT SP is established while the broadcast TWT recommendation field is indicated as another value, only the specific R-TWT SP established while the specific value is indicated may be an R-TWT SP having a changing operation policy within the R-TWT SP. For example, when a broadcast TWT recommendation field of a TWT element transmitted when an R-TWT SP is established is configured as a specific value (for example, 5), different operation methods may be applied to the R-TWT SP established by the corresponding TWT element for each time interval. In this case, when the broadcast TWT recommendation field of the TWT element transmitted when the R-TWT SP is established is configured as another value (for example, 4), the same operation method is the R-TWT SP established by the corresponding TWT element for all time intervals corresponding to the R-TWT SP. In this case, the operation method means an operation method (channel access and frame transmission method) related to whether only a frame of a low-latency TID is allowed to be transmitted or whether a frame of another TID is allowed to be restricted.

In addition, allowing of only transmission of a frame of a low-latency TID and then allowing transmission of a frame of another TID within a single R-TWT SP, that is, an operation method of an R-TWT SP, may be changed during the operation of the R-TWT SP by a pre-promised method. In this case, the AP may perform signaling for changing an operation during the R-TWT SP. In another method, the operation method of the R-TWT SP may be changed by a pre-promised rule. The method in which a transmission rule related to the low-latency TID is changed within the R-TWT SP during the operation by the pre-promised method is described in more detail through the following embodiments of the present invention, and thus a detailed description will be omitted. A frame transmission rule for a situation in which the operation method is changed within the single R-TWT SP (including a case where the operation method is changed by an R-TWT SP configuration method or a case where the operation method is changed during the operation of the R-TWT SP through a pre-promised method) is described through an embodiment of FIG. 22.

In another method, for the value of the broadcast TWT recommendation field, only one type of value indicating an R-TWT is used, and whether a TID restriction is applied may be indicated by each trigger frame.

For example, when there is an R-TWT SP while a value of a broadcast TWT recommendation field is indicated as 4, a trigger frame transmitted in the corresponding R-TWT SP may indicate whether a TID restriction is applied. In this case, the trigger frame may include a 1-bit subfield indicating whether a TID restriction is applied. If a 1 bit indicating whether the TID restriction is applied is indicated as 1, a TB PPDU transmitted as a response through a trigger frame may be restricted to include only an MPDU for a low-TID in a TB PPDU, like a TB PPDU transmitted within the TID-R-TWT. On the other hand, when a 1 bit indicating whether the TID restriction is applied is indicated as 0, a TB PPDU transmitted as a response through a trigger frame may include an MPDU of a TID other than the low-latency TID through aggregation, etc.

The above-described low-latency TID-related transmission restriction applied within the R-TWT SP may be prioritized over a (multi-TID) A-MPDU aggregation rule. That is, in the A-MPDU aggregation rule, while an MPDU corresponding to an AC having a higher priority than an AC of a specific EDCAF corresponding to a TXOP holder can be aggregated into an A-MPDU, the A-MPDU transmitted within the R-TWT SP cannot be aggregated into the A-MPDU if the MPDU is not traffic (MPDU) of the low-latency TID even though the MPDU is an MPDU corresponding to an AC having a higher priority than the AC of the EDCAF. Similarly, while an MPDU corresponding to an AC having a higher priority than a preferred AC indicated through a trigger frame can be included in a TB PPDU in the form of a multi-TID A-MPDU, but the MPDU corresponding to a TID other than the low-latency TID cannot be included in the multi-TID A-MPDU transmitted within the R-TWT SP.

If there is no more MPDU corresponding to the low-latency TID, a scheduled STA may need to configure a More Data subfield of a frame included in the last PPDU transmitted by the scheduled STA itself as 1 to notify that there is no more low-latency traffic to be transmitted to a scheduling AP.

FIG. 17 illustrates a value of a field included in a broadcast TWT parameter set field according to an embodiment of the present invention.

A broadcast parameter set information field transmitted to establish an R-TWT SP may indicate information related to the R-TWT SP by using a broadcast TWT recommendation subfield value of a request type field.

Referring to FIG. 17, when a value of the broadcast TWT recommendation subfield is configured as 4, it may be understood that the value indicates/interprets the corresponding broadcast TWT SP is an R-TWT SP. In addition, when the value of the broadcast TWT recommendation subfield is configured as 5, it may be also determined that the value indicates/interprets that the corresponding broadcast TWT SP is an R-TWT SP. However, two broadcast TWT recommendation subfield values indicating the R-TWT SP may indicate R-TWT SPs having different restrictions for a frame transmitted within the R-TWT SP. In this case, the restriction on the frame transmitted within the R-TWT SP may be a restriction related to a TID of a transmitted MPDU. More specifically, two R-TWT SP indicated by two different values may be R-TWT SPs in which different rules are applied to the TID of the transmittable MPDU.

For example, the R-TWT SP having the broadcast TWT recommendation field indicated as 4 may be an R-TWT SP in which transmission of low-latency traffic is proposed, and may be an R-TWT SP in which transmission of an MPDU corresponding to a TID other than the low-latency TID is restrictively allowed to be transmitted. In this case, traffic other than the low-latency traffic may be transmitted only when the low-latency traffic is transmitted or there is no low-latency traffic to be transmitted.

For example, the TID-R-TWT SP having the broadcast TWT recommendation field indicated as 5 is an R-TWT SP in which only transmission of low-latency traffic is allowed and traffic other than the low-latency traffic is not be transmitted.

Accordingly, when the broadcast TWT recommendation field value received from a scheduling AP is indicated as 4, a scheduled STA may recognize that a broadcast TWT corresponding to the broadcast TWT recommendation field is an R-TWT. In this case, the scheduled STA may prioritize to transmit an MPDU of a low-latency TID within the R-TWT and restrictively transmit an MPDU of a TID other than the low-latency TID.

In addition, when the broadcast TWT recommendation field value received from the scheduling AP is indicated as 5, the scheduling STA may recognize that a broadcast TWT corresponding to the broadcast TWT recommendation field is a TID-R-TWT having a TID restriction. In this case, the scheduled STA may need to transmit only the MPDU of the low-latency TID within the TID-R-TWT.

<Configuration of R-TWT SP>

When requesting a configuration of a TWT SP, a non-AP STA may transmit a request message for requesting the configuration of the TWT SP to an AP STA, and in this case, the request message may be transmitted by including information indicating the type of the TWT SP requesting the configuration. For example, when the non-AP STA requests the configuration of the R-TWT SP, the non-AP STA may configure, in the message requesting the configuration of the TWT SP, a specific bit value for requesting to configure the R-TWT SP, as 1, and transmit the same. Thereafter, the AP STA may configure the TWT SP according to the request of the non-AP STA, and then transmit information related to the configured TWT SP by including the same in a beacon frame or a management frame.

Specifically, the non-AP STA may request the AP to schedule the R-TWT SP by transmitting a TWT request frame to the AP. In this case, the non-AP STA may configure a DL (UL) TID bitmap valid bit as 1 in a TWT element (included in a TWT request frame) transmitted to request the R-TWT SP and transmit the same to the AP. This may be interpreted that the non-AP STA requests scheduling of the R-TWT SP by considering TIDs indicated using the restricted TWT DL (UL) TID bitmap as low-latency TIDs. In this case, when the DL (UL) TID bitmap valid bit included in the TWT element of the received TWT request frame is configured as 1, the AP may need to respond, in the TWT response frame, with the restricted TWT DL (UL) TID bitmap subfield identically configured to the restricted TWT DL (UL) TID bitmap subfield included in the TWT request frame. In other words, when the scheduling AP receives a request for scheduling of the R-TWT SP from the scheduled STA, the scheduling AP may need to schedule the R-TWT SP while considering TIDs indicated by the STA as low-latency TIDs.

<Operation of R-TWT SP>

According to the above-described embodiment of the present invention, the broadcast TWT parameter set field transmitted to establish the R-TWT SP may have a configuration of including the restricted TWT traffic information field. The restricted TWT traffic information field indicates information on the TID to be considered as low-latency traffic in the R-TWT SP, and the scheduled STA and/or the scheduling AP of the R-TWT SP perform traffic transmission on the basis of the TID information indicated in the R-TWT SP establishment process. That is, the established specific R-TWT SP may be an SP in which the same TIDs as low-latency TIDs even though the SP repeats.

However, traffic to be processed to be low-latency traffic by each STA may be determined regardless of the TID. For example, traffic of an application program processed by a specific STA may have characteristics to be processed as low-latency traffic even though the traffic is not video (AC_VI) or voice (AC_VO) data, and traffic of an application program to be processed by another STA may not need to be processed as low-latency traffic even though the traffic is video or voice data. As such, the traffic to be processed as low-latency traffic is determined according to a need of each STA, and may be impossible to be collectively classified by information related to the type of traffic such as a TID. Accordingly, each of the scheduled STAs may need to perform an operation by considering different TIDs as low-latency TIDs.

In addition, even within a single R-TWT SP, there may be a case where it is preferred to prioritize to process traffic in a specific time interval as necessary. In an example, within a single R-TWT SP in which TIDs 4 to 7 are considered as low-latency TIDs, the scheduling AP may be scheduled to transmit a total of four trigger frames. In this case, the AP may prefer to receive only MPDUs corresponding to TID 7 through a TB PPDU transmitted as a response to the first trigger frame, and may prefer to receive MPDUs corresponding to TID 6 as a response to the second trigger frame, and receive MPDUs corresponding to TIDs 5 and 4 as response to the third and fourth trigger frames, respectively. In this case, the scheduling AP may need to indicate, while transmitting a trigger frame, information on a TID of an MPDU that the scheduling AP desires to receive as a response to the corresponding trigger frame.

Accordingly, the AP having configured the R-TWT SP may include information for indicating a TID of traffic allowed to be transmitted in the configured R-TWT SP in a trigger frame and transmit the same. The information for indicating the TID of traffic allowed to be transmitted in the R-TWT SP may be included in the form of a bitmap, and each bit of the bitmap may indicate whether the TID corresponding to each bit is a TID for traffic allowed to be transmitted in the R-TWT SP. For example, when the bit of the bitmap is configured as "0", transmission of the corresponding TID may be restricted within the configured R-TWT SP, and when the vit is configured as "1", transmission of the corresponding TID may be allowed within the configured R-TWT SP.

Alternatively, the information for indicating the TID of traffic allowed to be transmitted in the configured R-TWT SP may be included in a user information field corresponding to information on each terminal of the trigger frame. In this case, the user information field may include only information on one TID, and TIDS of respective user information fields may be different TIDs.

Specifically, a scheduling AP may indicate, through a trigger frame transmitted within an R-TWT SP, information on a TID to be considered as a low-latency TID in a TB PPDU transmitted as a response to the corresponding trigger frame. Scheduled STAs each having an allocation of an RU through a specific trigger frame and responding with a TB PPDU and scheduled STAs each responding with a TB PPDU through an RA-RU may need to respond with a TB PPDU by considering TIDs indicated through the specific trigger frame as low-latency TIDs. In this case, responding with the TB PPDU by considering the TID as a low-latency TID may correspond to restricting TIDs of MPDUs included in a multi-TID A-MPDU transmitted through the TB PPDU as low-latency TIDs.

The information on the low-latency TID may be indicated only when the trigger frame is transmitted within the R-TWT SP. A subfield (of bits) indicated by a low-latency TID in a trigger frame transmitted within the R-TWT SP may be a reserved subfield of a subfield having other uses in the trigger frame transmitted in an interval other than the R-TWT SP.

When indicating information of the low-latency TID through the trigger frame, the scheduling AP may need to indicate the TID only from among the TIDs considered as low-latency TIDs by the R-TWT SP in which the corresponding trigger frame is transmitted. That is, if the R-TWT SP is an R-TWT SP in which TIDs 4 to 7 are considered as low-latency TIDs, the scheduling AP may need to indicate a TID only from among TIDs 4 to 7 when indicating the low-latency TID for the TB PPDU.

When the information on the low-latency TID is indicated through the trigger frame, the scheduled STA may need to operate on the basis of low-latency TID information indicated through the trigger frame when performing a response of the TB PPDU to the corresponding trigger frame. In other words, the scheduled STA may need to respond with the TB PPDU on the basis of TID information indicated as a low-latency TID through the trigger frame other than a TID indicated as a low-latency TID in the R-TWT SP. In other words, if a specific TID indicated as a low-latency TID in an R-TWT SP is not indicated as a low-latency TID in a trigger frame, an MPDU of the specific TID may be restricted to be transmitted (transmitted as a response) through a TB PPDU. In this case, a TB PPDU responding method in consideration of a low-latency TID is described through the above-described embodiments of the present invention, and thus a detailed description thereof is omitted.

However, a low-latency TID indicated through a trigger frame may be applied only when a TB PPDU is transmitted as a response to the corresponding trigger frame.

FIG. 18 illustrates an example of a format of a trigger frame including information on a TID of traffic transmittable in a restricted TWT SP according to an embodiment of the present invention.

A trigger frame transmitted by a scheduling AP within an R-TWT SP may include a TID indicator in a common info field. More specifically, a TID bitmap may be included. Bits of the TID bitmap correspond to different TIDs, respectively, and when a specific bit is indicated as 1, a TID corresponding to the specific bit may be indicated/interpreted to be a low-latency TID.

Referring to FIG. 18, a low-latency TID bitmap subfield may be included in a common info field of a trigger frame. The low-latency TID bitmap subfield is composed of 8 bits, and it may be interpreted that 8 bits correspond to TIDs 0 to 7, respectively.

When transmitting a trigger frame within the R-TWT SP, a scheduling AP may desire to receive TB PPDUs including only MPDUs for specific low-latency TIDs as a response form responding STAs (scheduled STAs). In this case, the scheduling AP may indicate the specific low-latency TID through a low-latency TID bitmap. In this case, the scheduling AP configures bits (of the low-latency TID bitmap) corresponding to the specific low-latency TIDs as 1.

When receiving the trigger frame within the R-TWT SP, the scheduled STAs may need to respond with TB PPDUs by including only MPDUs of low-latency TIDs indicated through the trigger frame. In this case, the scheduled STAs may need to configure a (multi-TID) A-MPDU to be included in the TB PPDU by considering that TIDs indicated through the low-latency TID bitmap are low-latency TIDs.

According to an embodiment of the present invention, a scheduling AP may indicate, through a trigger frame transmitted within an R-TWT SP, information on a TID to be considered as a low-latency TID in a TB PPDU transmitted as a response to the trigger frame to each scheduled STA. Scheduled STAs each having an allocation of an RU through the trigger frame and responding with the TB PPDU needs to respond with the TB PPDU by considering a TID indicated through a user information field (in which information related to its own AID is indicated through an AID12 subfield) included in the trigger frame as a low-latency TID. In this case, responding with the TB PPDU by considering the TID as a low-latency TID may be restricting TIDs of MPDUs included in a multi-TID A-MPDU transmitted through the TB PPDU as low-latency TIDs. Alternatively, responding with the TB PPDU by considering the TID as a low-latency TID may mean responding only an MPDU corresponding to a TID indicated as a low-latency TID through the TB PPDU.

As such, when the low-latency TID is indicated through the user information field, the scheduling AP may indicate that different TIDs for the respective scheduled STAs are low-latency TIDs. Accordingly, the respective scheduled STAs may operate while recognizing that different TIDs are low-latency TIDs even after receiving the same trigger frame within a specific R-TWT SP.

The information on the low-latency TID indicated in the user information field may have the form of directly indicating an ID of a TID rather than a TID bitmap. In other words, the number of a low-latency TID indicated in the user information field may be restricted to one. This may be a signaling method considered since spare bits which can be used to indicate the low-latency TID in the user information field are restricted. However, when a specific TID is indicated as a low-latency TID through the user information field, a TID having a higher priority than the specific TID may be automatically determined (interpreted) as a low-latency TID. That is, when a specific TID is indicated as a low-latency TID in the user information field, not only the specific TID but also a TID having a higher priority than the specific TID may be indicated together as low-latency TIDs.

Similar to the above-described indication of the low-latency TID using a common info field of a trigger frame, the low-latency TID indicated using the user information field may be also valid only when a TB PPDU for the trigger frame including the corresponding user information field is transmitted as a response.

FIG. 19 illustrates an example of a format of a user information field of a trigger frame including information on a TID of traffic transmittable in a restricted TWT SP according to an embodiment of the present invention.

Referring to FIG. 19, a user information field of a trigger frame transmitted within an R-TWT SP may include an indicator for a low-latency TID. In an embodiment of FIG. 19, the indicator for the low-latency TID is considered as a low-latency TID subfield. The low-latency TID subfield may be a subfield included in a trigger dependent user information subfield of the user information field. In this case, a bit in which the low-latency TID subfield is indicated may be a subfield, in a user information field of a trigger frame transmitted outside the R-TWT SP, the subfield being indicated using a bit in which a preferred AC subfield is indicated.

The low-latency TID subfield indicates information on a TID which needs to be considered as a low-latency TID by a scheduled STA having an allocation of an RU through the corresponding user information field and responding with a TB PPDU.

The above-described operation performed, in consideration of the low-latency TID, by an STA performing frame exchange within the R-TWT SP is as in 1) and 2) below.

1) Operation in TXOP Acquired by STA Itself

An STA having acquired a TXOP within an R-TWT SP transmits a frame corresponding to a low-latency TID first. When the STA transmits a multi-TID A-MPDU, only the frame corresponding to the low-latency TID may be aggregated with the multi-TID A-MPDU. In this case, when the frame corresponding to the low-latency TID is aggregated with the multi-TID A-MPDU, a restriction related to a TXOP limit of a primary AC is not applied. More specifically, even though the TXOP limit of the primary AC is 0, a frame of a low-latency TID corresponding to an AC other than the primary AC may be included in (aggregated with) the multi-TID A-MPDU. In addition, a frame of a low-latency TID corresponding to an AC having a lower priority than the primary AC may be included in the multi-TID A-MPDU. That is, when the frame of the low-latency TID is included in the multi-TID A-MPDU, a restriction related to the priority of the AC is not applied.

When there is no more frame corresponding to the low-latency TID in the STA, that is, when there is no frame corresponding to the low-latency TID in a transmission queue (of the EDCAF), the STA may transmit a frame other than the low-latency TID within a TXOP acquired by the STA itself. In this case, the frame other than the low-latency TID may be aggregated with the frame of the low-latency TID.

That is, the frame of the low-latency TID and the frame of the TID other than the low-latency TID may be included together in a single PPDU. In this case, the frame of the low-latency TID, included in the single PPDU, precedes the frame of another TID, included together therewith.

In addition, the STA may also transmit a PPDU including only a frame of a TID other than the low-latency TID within the R-TWT SP, and a condition that the STA transmits the PPDU including only another TID is that there is no more frame of the low-latency TID. In this case, the frame of the TID other than the low-latency TID may be aggregated according to a multi-TID A-MPDU of the conventional Wi-Fi. More specifically, among the frames of TIDs other than the low-latency TID, a frame corresponding to an AC having a higher priority than the primary AC may be aggregated. That is, when there is a frame of the low-latency TID, the frame of another transmittable TID may be limited to a frame corresponding to the AC having a higher priority than the primary AC. In this case, the frame corresponding to the same AC as the low-latency TID may be included in (aggregated with) the PPDU transmitted within the R-TWT SP.

2) Operation of Transmitting TB PPDU as Response to Trigger Frame

An STA for receiving a trigger frame within an R-TWT SP and responding with a TB PPDU may determine a frame included in the TB PPDU in consideration of a low-latency TID. More specifically, the STA responding with the TB PPDU within the R-TWT SP needs to respond by including, in the TB PPDU, only a frame of a TID indicated as the low-latency TID in the corresponding R-TWT SP. In this case, the STA responding with the frame of the low-latency TID by including the same in the TB PPDU may respond with the TB PPDU by including a multi-TID A-MPDU obtained by aggregating frames of the low-latency TID. In this case, the multi-TID A-MPDU included in the TB PPDU may be included in (aggregated with) frames of low-latency TIDs regardless of a value of a preferred AC subfield indicated by the trigger frame. That is, the STA responding with the TB PPDU in the R-TWT SP may respond with the TB PPDU by including the multi-TID A-MPDU including the low-latency TID, regardless of the preferred AC information indicated through the trigger frame.

However, when there is no more frame of the low-latency TID, the STA responding with the TB PPDU may respond with the TB PPDU by including the frame of a TID other than the low-latency TID. In this case, the STA responding with the TB PPDU by including the frame of the TID other than the low-latency TID needs to transmit the multi-TID A-MPDU by including the same in the TB PPDU according to the rule below.

MPDUs corresponding to a low-latency TID of a corresponding R-TWT SP is prioritized to be included.
Then, MPDUs corresponding to a preferred AC are next prioritized to be included.
Then, MPDUs of an AC having a higher priority than the preferred AC are next prioritized to be included.
The remaining MPDUs are included.

Additionally, an MPDU of a TID other than an AC corresponding to a low-latency TID may be included in a TB PPDU after MPDUs corresponding to the low-latency TID are prioritized to be included. For example, when only one of two TIDs corresponding to a specific AC is indicated as a low-latency TID, an MPDU corresponding to the low-latency TID is prioritized to be included in an A-MPDU, and an MPDU corresponding to the other TID may be included next. In this case, MPDUs of another AC (of a TID) not corresponding to the low-latency TID is included after the MPDUs corresponding to the other TID are included.

<Channel Access Management Method in R-TWT SP>

As being considered in the above-described embodiments of the present invention, the R-TWT SP may indicate information on the TID considered as a low-latency TID through a broadcast TWT parameter set field at the time of establishing the R-TWT SP, and it may be restricted to transmit only an MPDU of the low-latency TID within the R-TWT SP.

The conventional Wi-Fi allows the scheduled STA of the broadcast TWT SP to perform its own channel access (not corresponding to channel access through a trigger frame) through an EDCA, etc. within the broadcast TWT SP and initiate transmission. By considering above, it may be allowed for the scheduled STAs to perform channel access by itself through the EDCA, etc. also in the R-TWT SP which can be considered as a type of a broadcast TWT.

In this case, the R-TWT SP in which transmission of the MPDU of the TID other than the low-latency TID is restricted may be understood as a restricted TID channel access period which has never been considered in the conventional Wi-Fi. Accordingly, the scheduled STAs for performing channel access within the R-TWT SP perform channel access in consideration of the TID restriction.

According to an embodiment of the present invention, the scheduled STAs for performing channel access within the R-TWT SP perform the conventional EDCA operation, and may attempt TXOP acquisition only through the EDCAF corresponding to the low-latency TID for the UL direction. To describe the same in more detail, when the scheduled STA of the R-TWT SP attempts to acquire the TXOP by performing the channel access by itself, contention for channel access may need to be performed through the EDCAF of the AC corresponding to the low-latency TID. For example, when a specific R-TWT SP is established, low-latency TIDs of the R-TWT SP are indicated as TIDs 4 to 7, and TIDs 4 to 7 may be TIDs corresponding AC_VI and AC_VO. In this case, when the scheduled STA of the specific R-TWT SP desires to perform channel access through the EDCA within the R-TWT SP, the scheduled STA may need to acquire the TXOP only through the EDCAFs of AC_VI and AC_VO.

The EDCAF of another AC not corresponding to the AC indicated by the low-latency TID in the R-TWT SP may need not to participate in contending for acquisition of the TXOP within the R-TWT SP. That is, the other EDCAF may be understood as being in an inactive state. An operation performed when the specific EDCAF does not participate in the contending for acquisition of the TXOP (that is, in the inactive state) may be an operation using at least one of the following operations. In this case, an operation of not participating in contending for acquisition of a TXOP of an EDCAF, to be described below, may be performed in a TID-R-TWT SP to which a transmission constraint to a TID is applied. In this case, the TID-R-TWT SP may be identified through at least one of whether a value of a DL/UL TID bitmap valid subfield is 1 and whether a value of a broadcast TWT recommendation field is a specific value.

1) First, in a channel access procedure by an EDCA of an AC not corresponding to an AC of a TID allowed to be transmitted within the R-TWT SP, a channel state by carrier sensing (CS) of the corresponding channel is always determined as a busy state within the R-TWT SP, and thus a backoff counter may not be reduced.

That is, the EDCAF not participating in contending for acquisition of the TXOP within the R-TWT SP may consider that a medium is virtually busy in the R-TWT SP. That is, the EDCAF not participating in contending may not reduce the backoff counter during the R-TWT SP. In this case, the EDCAF not participating in contending for acquisition of the TXOP within the R-TWT SP may suspend a backoff operation without assessment to the medium state within the R-TWT SP.

2) Secondly, in a channel access procedure by an EDCA of an AC not corresponding to an AC of a TID allowed to be transmitted within the R-TWT SP, a value of 0 may be maintained even though a backoff counter reaches 0.

That is, the EDCAF not participating in contending for acquisition of the TXOP within the R-TWT SP may be considered may consider that a transmission queue of the AC corresponding within the R-TWT SP is empty. That is, the EDCAF not participating in contending may maintain the backoff counter value as 0 without attempting transmission even though the backoff counter reaches 0 during the R-TWT SP.

3) Thirdly, in a channel access procedure by an EDCA of an AC not corresponding an AC of a TID allowed to be transmitted within the R-TWT SP, when a backoff counter reaches 0, a backoff procedure may be restarted by a new backoff counter again.

That is, the EDCAF not participating in contending for acquisition of the TXOP within the R-TWT SP may need to invoke a new backoff procedure when the backoff counter reaches 0 in the R-TWT SP. That is, the EDCAF not participating in contending may start a new backoff procedure without attempting transmission when the backoff procedure is completed during the R-TWT SP.

In this case, the above-described operations 1), 2), and 3) are operations performed by EDCAFs corresponding to ACs, respectively, but it may be described in the present invention that an entity for performing channel access, a backoff procedure, etc. is an STA (for example, a scheduled STA) for convenience of description. That is, it may be expressed that an STA does not transmit an MPDU corresponding to a specific TID, and this may mean that an EDCAF of an AC corresponding to the specific TID among EDCAFs of the EDCA operation performed by the STA does not participate in contending for acquisition of a TXOP. In this case, the TXOP may include both a transmission opportunity in which a frame exchange sequence can be operated more than one time and a channel access opportunity in which single frame transmission (and response frame reception) can be performed.

Since ACs of the EDCA correspond to two TID, respectively, only one of two TIDs corresponding to a specific AC may be a low-latency TID, and the other TID may not be the low-latency TID. In this case, the specific AC may be considered as an AC corresponding to the low-latency TID. That is, even though the specific TID is not considered as the low-latency TID in the R-TWT SP (not indicated as the low-latency TID by the scheduling AP), the EDCAF of the corresponding AC may still participate in contending for acquisition of the TXOP.

Alternatively, there may be a method in which when only one of two TIDs corresponding to a specific AC is a low-latency TID and the other TID is not the low-latency TID, the specific AC is not considered as an AC corresponding to the low-latency TID. In this case, the EDCAF corresponding to the specific AC may not participate in contending for acquisition of the TXOP, and an MPDU for the low-latency TID among two TIDs corresponding to the specific AC may be transmitted in the transmission performed through the TXOP acquired bot another EDCAF. In this case, the method in which the EDCAF corresponding to the specific AC does not participate in contending for acquisition of the TXOP may be identical/similar to the above-described method in which the EDCAF of the AC not corresponding to the low-latency TID does not perform channel access.

When the scheduled STA of the R-TWT SP participates in contending for acquisition of the TXOP through the EDCAF corresponding to a specific TID (for example, a low-latency TID) and does not participate in contending for acquisition of the TXOP through another EDCAF according to the method of 1), the other EDCAF may perform an operation of suspending backoff, regardless of a medium state (idle or busy) identified through a PHY CS. This may be similar to an operation of considering the medium as busy only for some of the EDCAFs of the scheduled STA. Accordingly, the scheduled STA may perform the above-described operation of 1) by configuring, in the EDCAF not corresponding to the low-latency TID, a network allocation vector (NAV) so that the NAV is to be a value other than 0 during the R-TWT SP. In this case, the NAV may be a per-EDCAF NAV applied to each EDCAF, unlike the NAV used in the conventional Wi-Fi. In this case, the per-EDCAF NAV may be a type of timer applied to each EDCAF, and the EDCAF having the per-EDCAF NAV having a value other than 0 may need to perform an operation of not reducing a backoff counter as in a similar case where the medium is virtually busy. In this case, the per-EDCAF NAV may be maintained as a value other than 0 within the R-TWT SP. That is, the per-EDCAF NAV is configured with a value in consideration of a duration of the R-TWT SP at a start time point of the R-TWT SP, and the value of the per-EDCAF may be continuously reduced during the R-TWT SP. However, if the R-TWT SP ends earlier than the scheduled duration, the per-ECDAF NAV may be reset (that is, set to 0) together with termination of the R-TWT SP. On the other hand, if the R-TWT SP is extended longer than the scheduled duration, the per-EDCAF NAV may be also configured again in consideration of the extension period of the R-TWT SP. As another method, the R-TWT scheduled STA may perform an operation of configuring the per-EDCAF NAVs of the EDCAFs not corresponding to the low-latency TID as a value other than 0 when the R-TWT SP starts, and reset all of the per-EDCAFs to 0 when the R-TWT SP ends. Alternatively, other than the per-EDCAF NAV, an R-TWT SP-NAV commonly applied to the EDCAFs not corresponding to the low-latency TID may be utilized. When the R-TWT SP-NAV has a value other than 0, EDCAFs remaining after excluding the EDCAF corresponding to the TID considered as the low-latency TID within the R-TWT SP may not participate in contending for acquisition of the TXOP.

When an NAV is commonly applied to the EDCAFs not corresponding to the low-latency TID, it may mean that an NAV is commonly applied to all EDCAFs (AC_VO, AC_VI, AC_BE, and AC_BK) but is ignore by EDCAFs corresponding to the low-latency TID. That is, a timer (R-TWT SP-NAV) maintained as a value other than 0 for the R-TWT SP may be a timer commonly applied to all EDCAFs, and a timer ignored by an EDCAF corresponding to the low-latency TID. That is, the EDCAF corresponding to the low-latency TID may reduce a backoff counter or initiate transmission for TXOP acquisition even in a period in which the timer is not 0.

The R-TWT SP-NAV may be managed according to a method identical/similar to the above-described per-EDCAF NAV, and thus a detailed description is omitted.

To perform the operation of 1), when a specific R-TWT SP is started, a scheduled STA may configure per-EDCAF NAVs of specific EDCAFs in consideration of a duration of the specific R-TWT SP. In this case, the per-EDCAF NAV may be used in a virtual carrier sensing (CS) mechanism together with the conventional NAV commonly used by EDCAFs. That is, even though the per-EDCAF NAV is 0, if the NAV is a value other than 0, each EDCAF may need to determine that a result of virtual CS as busy. On the other hand, even though the NAV is 0, if a per-EDCAF NAV of a specific EDCAF is a value other than 0, the specific EDCAF may not need to reduce a backoff counter as if a result of virtual CS is busy.

When a scheduled STA of an R-TWT SP participates in contending for TXOP acquisition only through an EDCAF corresponding to a specific TID (for example, a low-latency TID) according to the method of b), another EDCAF may need to invoke a backoff procedure again at a time point at which the R-TWT SP is terminated. More specifically, EDCAFs having maintained the backoff counter as 0 for the R-TWT SP through the above-described operation of 2) may need to invoke a new backoff procedure at a time point at which the R-TWT SP is terminated. In this case, the operation of invoking the backoff procedure again may mean generating a backoff counter again.

The reason that EDCAFs need to invoke a backoff procedure at an end time point of the R-TWT SP is as follows.

When some EDCAFs do not participate in contending for TXOP acquisition through the method of 2), some EDCAFs may maintain a backoff counter value as 0 at a time point at which the R-TWT SP is terminated. This may be because some EDCAFs have not generated a backoff counter or have not attempted transmission even though the backoff counter is 0 by considering that a transmission queue of an AC related to some EDCAFs by themselves is empty. In this case, when the R-TWT SP ends, some EDCAFs (having maintained the backoff counter as 0) may immediately attempt transmission as in a similar case in which a frame to be transmitted is generated in the transmission queue of the AC. That is, two or more EDCAFs attempt to simultaneously perform transmission at a time point at which the R-TWT SP is terminated, and this may be the same for the EDCAFs of another STA. As such, collision may occur with a high probability since multiple EDCAFs can simultaneously perform transmission (TXOP acquisition) at an end time point of the R-TWT SP, and the EDCAF having maintained a backoff counter as 0 through the above-described operation of 2) to prevent collision may need to generate (invoke a backoff procedure) a new backoff counter at the end time point of the R-TWT SP. In this case, each of the EDCAFs invoking a new backoff procedure at the end time point of the R-TWT SP invokes a new backoff procedure while maintaining a contention window (CW)[AC] and a QOS STA retry counter (QSRC)[AC] of the corresponding AC as the existing value.

When the scheduled STA of the R-TWT SP participates in contending for TXOP acquisition only through an EDCAF corresponding to a specific TID (for example, a low-latency TID) according to the method of 3), another EDCAF may need to invoke a new backoff procedure when the backoff procedure is completed during the R-TWT SP. In other words, when a backoff counter becomes 0 (a corresponding slot boundary or a next slot boundary), EDCAFs not corresponding to the low-latency TID may need to invoke a new backoff procedure without initiating transmission for TXOP acquisition. This may be understood as an operation of repeating a backoff procedure of the EDCAF corresponding to another TID not to transmit an MPDU of another TID not considered as the low-latency TID for a specific R-TWT SP. In this case, the EDCAF invoking a new backoff procedure may need to invoke a new backoff procedure without changing the existing CW[AC] and QSRC[AC] of the corresponding AC.

A method of not performing transmission of an EDCAF not corresponding to a low-latency TID during an R-TWT SP through the above-described operations of 1), 2), and 3) may be applied only when there is a queueing frame (MSDU, A-MSDU, MMPDU, etc.) in a transmission (hereinafter, TX) queue of an EDCAF corresponding to the low-latency TID. That is, even in the R-TWT SP, if the TX queue of the EDCAF corresponding to the low-latency TID is empty, an inactive state of the EDCAF not corresponding to the low-latency TID may be released (that is, the state is changed to an active state). In this case, if there is only traffic corresponding a TID other than the low-latency TID in the TX queue of the EDCAF corresponding to the low-latency TID, it is possible to consider that the TX queue of the EDCAF corresponding to the low-latency TID is empty. That is, when the TX queue of the EDCAF corresponding to the low-latency TID is empty, it may mean one of: 1. a state in which no frame exists in the TX queue; and 2. a state in which a frame corresponding to the low-latency TID does not exist in the TX queue.

Alternatively, in another method, the method of not performing transmission of the EDCAF not corresponding to the low-latency TID during the R-TWT SP through the operations of 1), 2), and 3) may be applied until a separate indicate is received from the AP. More specifically, the AP may perform signaling of releasing a TXOP acquisition attempt limit related to the low-latency TID during the R-TWT SP. The signaling may be signaling indicated when the AP has determined that member STAs of the R-TWT SP do not have traffic corresponding to the low-latency TID. That is, the AP may perform signaling of releasing the TXOP acquisition attempt limit related to the low-latency TID when it is determined that R-TWT SP member STAs no longer have traffic corresponding to the low-latency during the R-TWT SP, and a non-AP STA corresponding to a member of the R-TWT SP may change the EDCAF not corresponding to the low-latency TID to the active state (the state in which a TXOP acquisition attempt is possible) when receiving the signaling. In the following embodiments, a condition for releasing a channel access limit applied to the EDCAF not corresponding to the low-latency TID is mainly considered as a case in which a transmission queue of the EDCAF corresponding to the low-latency is changed to empty, but it is possible to change a condition to a case where the AP performs signaling of releasing a TXOP acquisition attempt limit related to the low-latency TID and apply the changed condition. That is, in the following embodiments, the operation performed on the basis of whether the transmission queue of the EDCAF corresponding to the low-latency TID is empty may be appropriately substituted with an operation performed on the basis of whether signaling of releasing the TXOP acquisition attempt limit related to the low-latency TID is received from the AP, and understood.

To describe the above-described method 1) in more detail, a timer applied to an EDCAF not corresponding to a low-latency TID may be applied only when there is a queueing frame in a TX queue of an EDCAF corresponding to the low-latency TID. That is, when the TX queue of the EDCAF corresponding to the low-latency TID is in an empty state, an EDCAF not corresponding to the low-latency TID may be also allowed to reduce a backoff counter or initiate transmission for TXOP acquisition.

To described the above-described method 2) in more detail, an operation of considering a TX queue of an EDCAF not corresponding to a low-latency TID as empty may be applied only when there is a queueing frame in a TX queue of an EDCAF corresponding to the low-latency TID. That is, when the TX queue of the EDCAF corresponding to the low-latency TID is in an empty state, the TX queue of the EDCAF not corresponding to the low-latency TID may not be considered as the empty state.

To described the above-described method 3) in more detail, an operation of invoking again a backoff procedure of an EDCAF not corresponding to a low-latency TID may be applied only when there is a queueing frame in a TX queue of an EDCAF corresponding to the low-latency TID. That is, if the TX queue of the EDCAF corresponding to the low-latency TID is in an empty state, an EDCAF not corresponding to the low-latency TID may initiate transmission for TXOP acquisition without invoking a new backoff procedure when the backoff counter becomes 0.

In addition, the above-described methods of 1), 2), and 3) may be applied to all EDCAFs of STAs other than a member of the R-TWT SP. That is, the STAs other than the member of the R-TWT SP may manage the channel access procedure of all EDCAFs in the same manner as the management method of the EDCAF not corresponding to the low-latency TID, considered in the above-described methods 1), 2) and 3), thereby not attempting channel access during the R-TWT SP.

To describe the operation of an STA other than the member of the R-TWT SP in more detail in relation to operation 1), the STA other than the member of the R-TWT SP may management a backoff procedure of each EDCAF by using a timer commonly applied to all EDCAFs. In this case, the timer is maintained as a value other than 0 during the R-TWT SP, and each EDCAF suspends (freezes) a backoff procedure by considering the same case where the channel state is busy during a period in which the timer is not 0. In the same method, the STA other than the member of the R-TWT SP may not attempt channel access (TXOP acquisition) during the R-TWT SP.

To describe the operation of an STA other than the member of the R-TWT SP in more detail in relation to operation 2), the STA other than the member of the R-TWT SP may consider that the TX queue of all EDCAFs as empty. In this case, a time interval in which the STA other than the member of the R-TWT SP considers the TX queue as empty may be an R-TWT SP in which the STA itself is not a member. In this case, the STA other than the member of the R-TWT SP may invoke a new backoff procedure for each EDCAF having a backoff counter corresponding to 0 when the R-TWT SP in which the STA itself is not a member ends. In the same method, the STA other than the member of the R-TWT SP may not attempt channel access (TXOP acquisition) during the R-TWT SP.

To describe the operation of an STA other than the member of the R-TWT SP in more detail in relation to operation 3), the STA other than the member of the R-TWT SP may invoke a new backoff procedure when a backoff procedure of each EDCAF is completed. In this case, a condition for newly invoking a backoff procedure of each EDCAF by the STA other than the member of the R-TWT SP may be that a backoff procedure completion time point of each EDCAF is a time point corresponding to the R-TWT SP in which the STA itself is not a member. In the same method, the STA other than the member of the R-TWT SP may not attempt channel access (TXOP acquisition) during the R-TWT SP.

That is, all EDCAFs of the STA not a member of the R-TWT SP may become inactive (no attempt for TXOP acquisition) during the R-TWT SP through the above-described methods 1), 2), and 3). This may be understood the same like a case where the STA other than the member of the R-TWT SP considers all EDCAFs as EDCAFs not corresponding to the low-latency TID, regardless of the type of a TID indicated/promised as the low-latency TID in the R-TWT SP. In this case, a method of in which the STA other than the member of the R-TWT SP manages each EDCAF is identical/similar to the above-described management method of the EDCAF not corresponding to the low-latency TID, and thus a detailed description is omitted.

Figure 20:
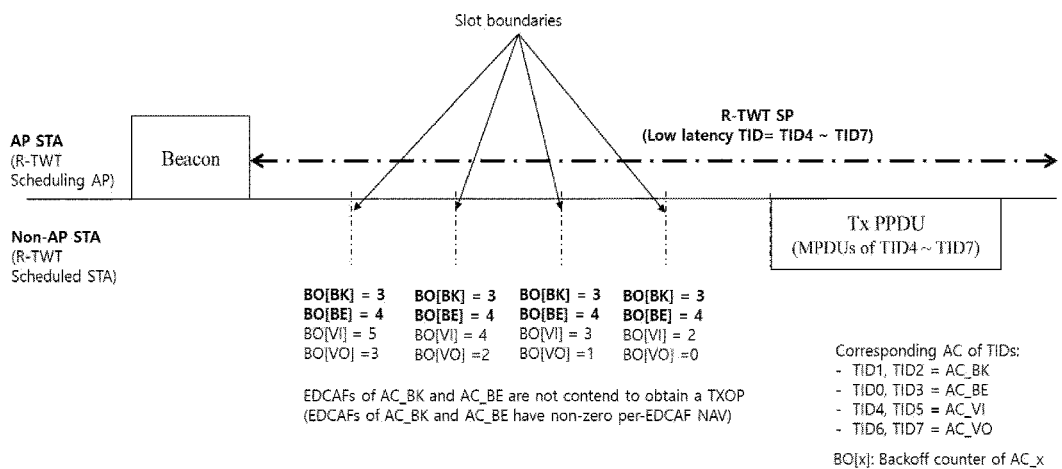
FIG. 20 illustrates an example of an enhanced distributed channel access (EDCA) operation for channel access in a restricted TWT SP according to an embodiment of the present invention.

FIG. 20 illustrates an example of an enhanced distributed channel access (EDCA) operation for channel access in a restricted TWT SP according to an embodiment of the present invention.

Referring to FIG. 20, an R-TWT SP in which TIDs 4 to 7 are considered as low-latency TIDs starts after a beacon frame transmitted by an AP. The R-TWT SP is an R-TWT SP in which TIDs 4 to 7 are considered as low-latency TIDs, and a restricted R-TWT SP in which transmission of an MPDU corresponding to a TID other than the low-latency TID is restricted. A non-AP STA corresponding to a scheduled STA of the R-TWT SP may suspend contending for acquisition of a TXOP of an EDCAF other than an EDCAF corresponding to a low-latency TID not to perform transmission of an MPDU other than the low-latency TID within the R-TWT SP. That is, the scheduled STA of the R-TWT SP attempts channel access only through an EDCAF of an AC corresponding to the low-latency TID within the R-TWT SP. In this case, the operation illustrated in the embodiment of FIG. 20 corresponds to a method of not participating in contending for acquisition of the TXOP by using the above-described method 1).

As illustrated in FIG. 20, a non-AP STA may perform an operation of reducing only a backoff counter of the EDCAF corresponding to the low-latency TID within the R-TWT SP. More specifically, only an EDCAF corresponding to the low-latency TID among the EDCAFs of the non-AP STA may perform an operation of reducing a backoff counter at a slot boundary. That is, EDCAFs of AC_BK and AC_BE corresponding to TIDs 0 to 3 among the EDCAFs of the non-AP STA may need to perform, at each slot boundary existing in the R-TWT SP, an operation (make determination) of maintaining the backoff counter without reducing the same regardless of whether each slot is idle/busy.

The non-AP STA corresponding to the scheduled STA of the R-TWT SP may suspend contending for acquisition of a TXOP an EDCAF other than the EDCAF corresponding to the low-latency TID not to perform transmission of an MPDU other than the low-latency TID within the R-TWT SP. That is, the scheduled STA of the R-TWT SP attempts channel access only through the EDCAF of the AC corresponding to the low-latency TID within the R-TWT SP. In this case, the operation illustrated in the embodiment of FIG. 20 is corresponds to a method of not participating in contending for acquisition of the TXOP by using the above-described method 1).

A non-AP STA may perform an operation of reducing only a backoff counter of the EDCAF corresponding to the low-latency TID within the R-TWT SP. More specifically, only an EDCAF corresponding to the low-latency TID among the EDCAFs of the non-AP STA may perform an operation of reducing a backoff counter at a slot boundary. That is, EDCAFs of AC_BK and AC_BE corresponding to TIDs 0 to 3 among the EDCAFs of the non-AP STA may need to perform, at each slot boundary existing in the R-TWT SP, an operation (make determination) of maintaining the backoff counter without reducing the same regardless of whether each slot is idle/busy.

In addition, although not shown in FIG. 20, the non-AP STA not corresponding to a member of the R-TWT SP maintains all EDCAFs to be in an inactive state during the R-TWT SP. That is, a non-AP STA other than the member of the R-TWT SP does not attempt TXOP acquisition by reducing no backoff counter of each EDCAF during the R-TWT SP, considering the transmission queue of all EDCAFs as being in empty state, or invoking a new backoff procedure when the backoff procedure of each EDCAF has been completed.

Figure 21:
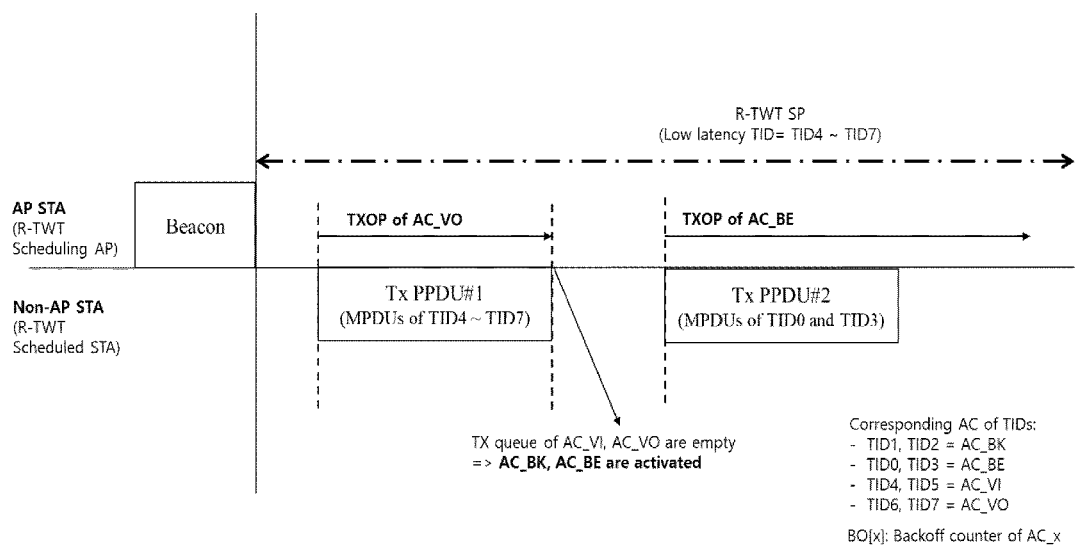
FIG. 21 illustrates an example of a method of transmitting traffic for a TID allowed to be transmitted and a TID restricted to be transmitted in a restricted TWT SP according to an embodiment of the present invention.

FIG. 21 illustrates an example of a method of transmitting traffic for a TID allowed to be transmitted and a TID restricted to be transmitted in a restricted TWT SP according to an embodiment of the present invention.

Referring to FIG. 21, an R-TWT SP in which TIDs 4 to 7 are considered as low-latency TIDs starts after a beacon frame transmitted by an AP. That is, AC_VI and AC_VO are EDCAFs corresponding to the low-latency TID and AC_BE and AC_BK are EDCAFs not corresponding to the low-latency TID within the corresponding R-TWT SP. Accordingly, among the EDCAFs of a non-AP STA corresponding to a scheduled STA of the R-TWT SP, AC_VO and AC_VI corresponding to the EDCAFs corresponding to the low-latency TID are in an active state, and AC_BE and AC_BK are in an inactive state.

A non-AP STA corresponding to the scheduled STA of the R-TWT SP acquires a TXOP through AC_VO corresponding to a low-latency EDCAF, and transmits frames of TIDs 6 and 7 corresponding to AC_VO and frames of TIDs 4 and 5 corresponding to AC_VI through PPDU #1.

After transmitting PPDU #1, the non-AP STA does not have a queueing frame any longer in a transmission queue of AC_VI and AC_VO.

In this case, a transmission queue of all EDCAFs corresponding to the TID indicated/promised as the low-latency TID in the corresponding R-TWT SP becomes an empty state, and thus the remaining EDCAFs not corresponding to the low-latency TID, that is, AC_BK and AC_BE, are switched to an active state.

The non-AP STA acquires a TXOP through AC_BE (that is, AC_BE becomes a TXOP holder), and transmits a frame (MSDU, A-MSDU, etc.) corresponding to TID 0 or TID 3 through PPDU #2.

In addition, although not shown in FIG. 21, the non-AP STA other than a member of the R-TWT SP maintains all EDCAFs as an inactive state during the R-TWT SP. That is, the non-AP STA other than the member of the R-TWT SP may not attempt TXOP acquisition by not reducing a backoff counter of each EDCAF during the R-TWT SP, considering the transmission queue of all EDCAFs as empty, or invoking a new backoff procedure when the backoff procedure of each EDCAF is completed.

<Channel Access Management Method in Consideration of TID-to-Link Mapping>

The TID-to-link mapping means a mechanism enabling to determine a TID to be transmitted/received and a link through which the TID is to be transmitted/received between two MLDs having established a multi-link setup. The TID-to-link mapping may be determined for each of the DL and UL directions, and when a TID-to-link mapping negotiation between an AP MLD and an STA MLD is performed, the AP MLD and the STA MLD may need to determine a transmission link in consideration of a TID of a frame transmitted by each of the MLDs. For example, the AP MLD and the (non-AP) STA MLD have performed the multi-link setup through two links, and have negotiated to map TIDs 0 to 3 to link 1 and TIDs 4 to 7 to link 2 for the DL direction. In this case, when transmitting DL traffic to the STA MLD, the AP MLD needs to transmit traffic (MSDU, MPDU, etc.) corresponding to TIDs 0 to 3 through link 1 only, and needs to transmit traffic corresponding to TIDs 4 to 8 through link 2 only.

Similarly, the non-AP STA MLD may also need to transmit UL traffic in consideration of the TID-to-link mapping negotiation of the UL direction. For example, the AP MLD and the (non-AP) STA MLD have performed a multi-link setup through two links, and have negotiated to map TIDs 0 to 3 to link 1 and TIDs 4 to 7 to link 2 for the UL direction. In this case, when transmitting UL traffic to the AP MLD, the non-AP STA MLD needs to transmit traffic (MSDU, MPDU, etc.) corresponding to TIDs 0 to 3 through link 1 only, and needs to transmit traffic corresponding to TIDs 4 to 8 through link 2 only.

As such, when two MLDs having performed the multi-link setup performs a TID-to-link mapping negotiation (mapping other than a default TID-to-link mapping mode), two MLDs may need to transmit traffic of a specific TID through a specific link only in consideration of the TID-to-link mapping. That is, in a link to which a specific TID is not mapped in a transmission direction, traffic transmission for the specific TID may not need to be attempted.

Accordingly, when the non-AP STA MLD transmits traffic of a specific TID to the AP MLD, in a link to which the specific TID is mapped, traffic transmission for the specific TID may not need to be attempted. In this case, the non-AP STA MLD may not perform, in a non-AP STA operated in a link to which a specific TID is not mapped in the UL direction, channel access through an EDCAF corresponding to the specific TID. In other words, when a specific TID is mapped to a specific link in the UL direction, the non-AP MLD may not perform (participate in) contending for TXOP acquisition through some of EDCAFs of the STA operated in the specific link.

If a specific link of the non-AP STA MLD is in a disabled state (a state in which no TID is mapped), an STA of the non-AP STA MLD operated in the specific link may not need to perform channel access through any EDCAF. That is, the STA of the non-AP STA MLD operated in the disabled link (to which no TID is mapped) may be understood that all EDCAFs are in an inactive state. In this case, the inactive EDCAF may have the similar state to the inactive EDCAF (see FIG. 20) within the R-TWT SP according to the TID-to-link mapping state. That is, the inactive EDCAF may not participate in contending for TXOP acquisition by using the above-described operations of 1), 2), and 3) according to the TID-to-link mapping state. However, according to the TID-to-link mapping state, the inactive EDCAF may maintain the inactive state until TID-to-link mapping is changed without performing the operation considering the duration of the R-TWT SP.

Another difference is that in relation to the R-TWT SP, the inactive EDCAF is activated when the R-TWT SP ends, but according to the TID-to-link mapping state, the inactive EDCAF may be activated when TID-to-link mapping is changed to a default mode, or when a TID-to-link mapping negotiation through which the TID corresponding to the inactive EDCAF is mapped to the corresponding link (for the UL direction) is performed.

<Method of Operating R-TWT SP in Stages>

According to the above-described embodiment of the present invention, an AP may configure two types of R-TWT SPs. One of the two types of R-TWT SPs may be an SP having a stricter rule in which only a low-latency TID is transmitted, and the other one may be a flexible SP in which transmission of another TID is allowed when there is no low-latency TID.

In the present invention, a reason of considering two types of R-TWT SPs is to allow selection between a priority enhancement method for the low-latency TID and more efficient utilization of a time period corresponding to the R-TWT SP. The characteristics of two types of R-TWT SPs are as follows.

1) When only traffic of a low-latency TID can be transmitted within the R-TWT SP, a case where only some time intervals of the R-TWT SP are utilized for a service of the low-latency TID and the other time intervals are wasted may occur.
2) When traffic transmission of another TD is allowed within the R-TWT SP, transmission of another STA having the low-latency TID may be delayed while traffic of another TID is serviced.

Accordingly, the AP and the non-AP may desire to operate the R-TWT SP in different methods according to the purpose, and may selectively operate one of the two R-TWT SPs or participate in as a member as being considered in the present invention.

However, when whether traffic of a TID other than a low-latency TID is transmittable is determined in units of R-TWT SPs, a specific R-TWT SP may have a time period that is continuously wasted, and another R-TWT SP may have a problem that processing of low-latency TID traffic is delayed.

To solve such a problem, according to an embodiment of the present invention, it is possible to divide a single R-TWT SP and operate the same by using different policies. More specifically, in some time periods of the single R-TWT SP, only traffic of the low-latency TID is allowed to be transmitted, and in the other time periods, traffic of a TID other than the low-latency TID may be allowed to be transmitted. However, the other time periods are time periods within the R-TWT SP, and thus traffic of the low-latency TID is still prioritized to be transmitted, and transmission of traffic of another TID is allowed only when there is no traffic of the low-latency TID.

In this case, time periods to which different operation policies are applied may be determined to have some ratios and the other ratios in the duration of the R-TWT SP. For example, in the duration of the R-TWT SP, an R-TWT SP corresponding to a first half allows transmission of the low-latency TID, and an R-TWT SP corresponding the other half allows transmission of another TID. In this case, information related to the time periods to which different polices are applied in the duration of the R-TWT SP. In this case, if the AP does not indicate information related to time periods to which different policies are applied in the duration of the R-TWT SP, a pre-promised time period (ratio) of the R-TWT SP may be determined as a time period in which only transmission of the low-latency TID is allowed. That is, a time period of the R-TWT SP corresponding to the ratio pre-promised between the AP and the non-AP STA may be determined as a time period in which only the low-latency TID can be transmitted. In this case, the other time period may be a time period in which traffic of a TID other than the low-latency TID can be transmitted when there is no low-latency TID. In this case, the non-AP STA may need to transmit only traffic corresponding to the low-latency TID in the time period in which only the low-latency TID can be transmitted, and may need to transmit traffic of a TID other than the low-latency TID in the other time period, among the R-TWT SP.

As another method, a rule of changing an operation policy (method) (changing from a method of transmitting only a frame of a low-latency TID to a method of also restrictively allowing transmission of a frame of a TID other than the low-latency TID) within the R-TWT SP may be determined whether a specific time has passed since the R-TWT SP is started. More specifically, it may be possible that only transmission of a frame of a low-latency TID is allowed before a pre-promised time passes after the R-TWT SP is started, and transmission of a frame of a TID other than the low-latency TID is allowed after a pre-promised time has passed. For example, among the R-TWT SP, a time period corresponding to the first 1 TU may be a period in which only transmission of a frame of the low-latency TID is allowed, and the other time period may be a period in which transmission of a frame of a TID other than the low-latency TID is allowed.

As another method, a rule of changing the operation policy (method) within the R-TWT SP may be determined by whether the R-TWT SP is overlapped with another specific time period. More specifically, a time period of the R-TWT SP overlapping with a quiet interval (duration) configured for the purpose of protection the R-TWT SP may be a period in which only transmission of a frame of the low-latency TID is allowed. In this case, the other R-TWT SP period not overlapping with the quiet interval may be a time period in which transmission of a frame of a TID other than the low-latency TID is allowed. In this case, a time period configured together to specify a period in which the operation method of the R-TWT SP is changed may be a time period other than the quiet interval. In this case, the other time period may be a time period configured to start at the same time point as the start time point of the R-TWT SP. In this case, the other time period may be configured by the AP to specific an operation method changing time point of the R-TWT SP.

Alternatively, the method of changing the operation method within the R-TWT SP may be performing explicit indication by the AP. More specifically, the AP may perform signaling for the purpose of changing the operation method during the R-TWT SP. In this case, the signaling may be performed through a pre-promised specific frame, or may be performed through A-control (indicated through an HT control field of a MAC header) or More Data subfield (bit included in a frame control field of a MAC header). In this case, the signaling may be performed through a frame (group addressed, broadcast) other than an individually addressed frame.

For example, within the R-TWT SP, the AP may transmit a pre-promised frame (for example, a CF-end frame, etc.) to allow transmission of a frame of a TID other than the low-latency TID. A non-AP STA having received the frame pre-promised from the AP while the R-TWT SP in which only the frame of the low-latency TID can be transmitted proceeds may recognize that the operation method for the other R-TWT SP has been changed so that transmission of the frame of the TID other than the low-latency TID is allowed.

In another example, the AP may configure, as 0, a More Data subfield of a transmitted non-individually addressed frame (group addressed frame) to allow transmission of a frame of a TID other than the low-latency TID within the R-TWT SP. That is, the More Data subfield transmitted by the AP within the R-TWT SP may be utilized to indicate the operation method change of the R-TWT SP, instead of indicating whether the AP has group address bufferable units (BUs). A non-AP having identified that the More Data subfield of the group addressed frame received from the AP is configured as a specific value (for example, 0) while the R-TWT SP in which only the frame of the low-latency TID can be transmitted proceeds may recognize that the operation method for the remaining R-TWT SP has been changed so that transmission of a frame of a TID other than the low-latency TID is allowed. In this case, a method of distinguishing whether the frame received from the AP is a group addressed frame may be performing identification through whether a receiver address (RA) of a MAC header of the received frame includes a group address. As such, when the More Data subfield is utilized for the operation method indication of the R-TWT SP, while the R-TWT SP in which transmission of a frame of a TID other than the low-latency TID is allowed proceeds, it may be changed to an R-TWT SP in which only transmission of a frame of the low-latency TID is allowed as a value indicated by the More Data subfield is changed. That is, when the value of the More Data subfield of the group addressed frame transmitted by the AP is a specific value, only transmission of the frame of the low-latency TID may be allowed in the R-TWT SP, and when the More Data subfield value is another value, transmission of the frame of the TID other than the low-latency TID may be allowed in the R-TWT SP.

Figure 22:
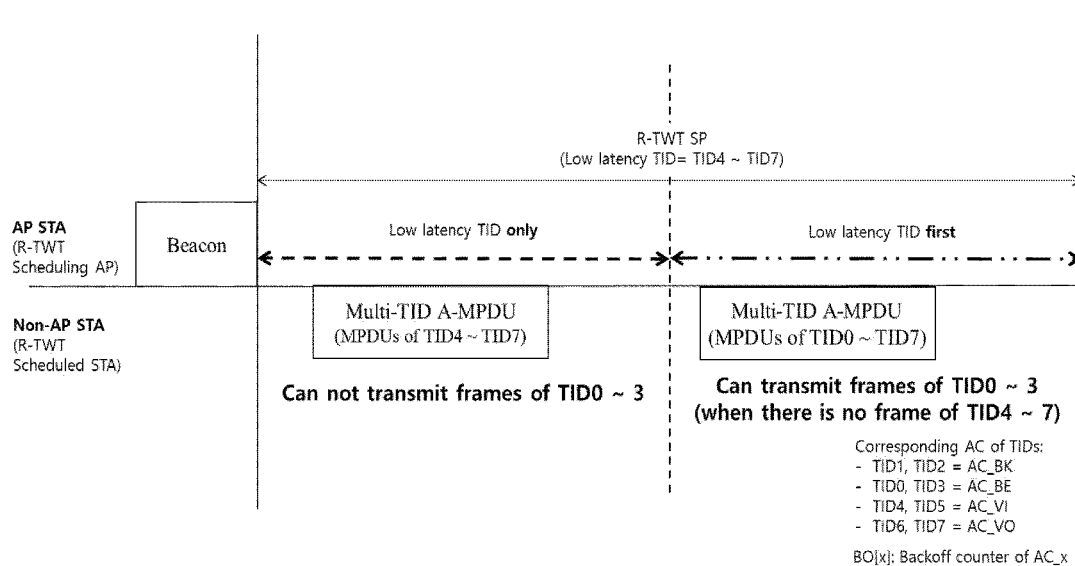
FIG. 22 illustrates an example of a method in which different operation policies are applied to different intervals in a single restricted TWT SP according to an embodiment of the present invention.

FIG. 22 illustrates an example of a method in which different operation policies are applied to different intervals in a single restricted TWT SP according to an embodiment of the present invention.

Referring to FIG. 22, an R-TWT SP in which TIDs 4 to 7 are considered as low-latency TIDs starts after a beacon frame transmitted by an AP.

A preceding time interval (a low-latency TID only interval of FIG. 22) among times intervals corresponding to the R-TWT SP is an interval in which only transmission of a low-latency TID is allowed, and the rest time interval (the low-latency TID first interval of FIG. 22) is a time interval in which transmission of traffic OH another TID is allowed when there is no more traffic corresponding to the low-latency TID.

Accordingly, a non-AP STA corresponding to a member of the R-TWT SP transmits only MPDUs of TIDs 4 to 7 corresponding to low-latency TIDs of the corresponding R-TWT SP when transmitting multi-TID A-MPDU #1 during the preceding time interval of the time intervals of the R-TWT SP.

The non-AP STA aggregates MPDUs of TIDs 0 to 3 with multi-TID A-MPDU #2 transmitted after termination of the preceding time interval and transmits the same because there are no more frames of TIDs 4 to 7.

Figure 23:
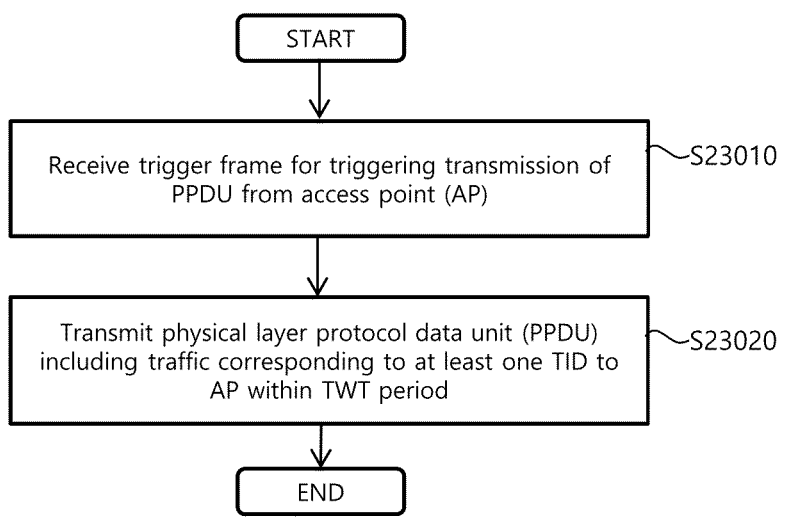
FIG. 23 is a flow chart illustrating an example of an operation of a terminal according to an embodiment of the present invention.

FIG. 23 is a flow chart illustrating an example of an operation of a terminal according to an embodiment of the present invention.

Referring to FIG. 23, when a period in which only a specific frame can be transmitted by an AP STA is configured, a non-AP STA may receive information related to a TID for traffic which can be transmitted in the configured period from the AP STA, and transmit traffic corresponding to the TID in the configured period on the basis of the received information.

Specifically, the non-AP STA receives a trigger frame for triggering transmission of a PPDU from the AP STA (S23010). In this case, the trigger frame includes information indicating at least one traffic identifier (TID) allowed to be transmitted in a TWT period, and the TWT period may means a period in which transmission of traffic for the at least one TID is allowed and a period in which transmission of traffic not having the specific transmission condition is restricted.

Specifically, as illustrated in FIGS. 15 to 22, an R-TWT SP may be configured so that traffic satisfying a specific condition is allowed to be transmitted by the AP and traffic not satisfying the specific condition is restricted to be transmitted. In this case, whether the specific condition is satisfied indicates information related to a TID corresponds to transmission of information (for example, information indicating a TID corresponding to traffic satisfying a specific condition) related to a TID corresponding to the corresponding traffic by the AP, and the non-AP STA may transmit or receive, within the TWT SP, traffic corresponding to the TID transmitted from the AP. In this case, the specific condition may be a condition (for example, low-latency traffic, etc.) related to a transmission delay of traffic, and transmission of traffic having no specific condition may be restricted. When transmission is restricted, it may mean that transmission is impossible during the R-TWT SP, transmission is possible under a specific constraint (for example, transmission through aggregation with an MPDU of traffic corresponding to a TID satisfying a specific condition, transmission through aggregation with an MPDU of traffic corresponding to a TID satisfying a specific condition within a specific period configured in the TWT SP, etc.), or channel access through an EDCAF of an AC corresponding to TIDs not indicated by the AP is restricted.

Alternatively, the configured R-TWT SP may be re-configured as multiple periods, and only traffic for the TID corresponding to traffic having a specific condition may be transmitted in at least one specific period, and traffic for the TID corresponding to traffic not having the specific condition may be allowed to be transmitted under a restricted condition (or a specific constraint) in a period remaining after excluding the at least one specific period. For example, when an R-TWT SP is composed of a first period and second period, only traffic for a TID corresponding to traffic having a specific condition (for example, low-latency, etc.) may be transmitted in the first period, and transmission of traffic for a TID corresponding to traffic not having a specific condition may be allowed under a restricted condition (or a specific constraint) in the second period.

The information related to the TID may have each bit indicating a specific TID in the form of a bitmap, and may be included in a user information field including a trigger frame or information on each terminal of the trigger frame and transmitted.

For example, when a restricted TWT SP (hereinafter, referred to as R-TWT SP) which enables transmission of low-latency traffic only is configured, each of the STAs may be allowed to transmit low-latency traffic only within the R-TWT SP interval, and restricted to transmit traffic other than the low-latency traffic. In this case, the type of traffic which can be transmitted within a specific R-TWT SP by the STAs may be limited to traffic corresponding to the TIDs indicated from the AP. That is, in a process of configuring (setting up) the R-TWT SP, TIDs of traffic which can be transmitted during the corresponding R-TWT SP may be configured, and the configured TIDs may be notified to the STA. In this case, non-AP STAs may transmit only traffic corresponding to TIDs indicated from the AP within the corresponding R-TWT SP, and traffic corresponding to TIDs not indicated from the AP may be restricted to be transmitted.

Thereafter, the non-AP STA may transmit a physical layer protocol data unit (PPDU) including traffic corresponding to at least one TID to the AP in the TWT period (S23020).

In this case, the trigger frame may be transmitted within the TWT period.

The above-mentioned description of the present invention is for illustrative purposes, and it will be understood that those who skilled in the art to which the present invention belongs can easily modify the present invention in other specific forms, without altering the technical ideas or essential characteristics of the present invention. Therefore, the embodiments described above are illustrative and are not limited in all aspects. For example, each element described as a single entity may be distributed and implemented, and likewise, elements described as being distributed may also be implemented in a combined form.

The scope of the present invention is defined by the appended claims rather than the above detailed description, and all changes or modifications derived from the meaning and range of the appended claims and equivalents thereof should be interpreted as being included within the scope of the present invention.

The invention claimed is:

1. A wireless communication terminal of a wireless communication system, the wireless communication terminal comprising:
a transceiver; and
a processor,
wherein the processor is configured to:
receive a frame for triggering transmission of a physical layer protocol data unit (PPDU) within a restricted target wake time (R-TWT) period from an access point (AP),
wherein the R-TWT period is a period in which a first frame(s) for a low latency traffic identifier (TID)(s) is transmitted with priority over a second frame(s) for a first TID(s) different from the low latency TID(s), and
wherein the second frame(s) for the first TID(s) is allowed to be transmitted within the R-TWT period depending on whether one of the restricted conditions is satisfied, and
transmit a trigger-based (TB) PPDU including the first frame(s) for the low latency TID(s) within the R-TWT period based on the frame,
wherein the first frame(s) is first included in an Aggregate Medium Access Control Protocol Data Unit (A-MPDU) before the second frame(s) when the TB PPDU includes the A-MPDU in which the first frame(s) for the low latency traffic identifier (TID)(s) and the second frame(s) for the first TID(s) are aggregated.

2. The wireless communication terminal of claim 1, wherein the restricted conditions include i) whether all of the first frame(s) stored in a queue have been transmitted, and ii) whether the second frame(s) is aggregated with the first frame(s) and included in the A-MPDU.

3. The wireless communication terminal of claim 1, wherein the processor is further configured to:
receive a specific frame including information to indicate the low latency TID(s).

4. The wireless communication terminal of claim 1, wherein the low latency TID(s) is mapped to at least one first Access Category (AC), and
wherein the first TID(s) is mapped to at least one second AC that is different from the at least one first AC.

5. The wireless communication terminal of claim 4, wherein a decrease of a first back-off counter for the at least one second AC mapped to each of the first TID(s) suspends when the R-TWT period starts.

6. The wireless communication terminal of claim 5, wherein after the decrease of the first back-off counter suspends within the R-TWT interval, the decrease of the first back-off counter resumes after i) all of the first frame(s) stored in a queue have been transmitted, or ii) the R-TWT period is ended.

7. The wireless communication terminal of claim 4, wherein the at least one first AC for a plurality of TIDs including the low latency TID(s) and a second TID(s) is mapped to a second back-off counter, and
wherein a decrease of the second back-off counter within the R-TWT period does not suspend for the R-TWT period.

8. A traffic transmission method performed by a terminal in a wireless communication system, the method comprising:
receiving a frame for triggering transmission of a physical layer protocol data unit (PPDU) within a restricted target wake time (R-TWT) period from an access point (AP),
wherein the R-TWT period is a period in which a first frame(s) for a low latency traffic identifier (TID)(s) is transmitted with priority over a second frame(s) for a first TID(s) different from the low latency TID(s), and
wherein the second frame(s) for the first TID(s) is allowed to be transmitted within the R-TWT period depending on whether one of the restricted conditions is satisfied, and
transmitting a trigger-based (TB) PPDU including the first frame(s) for the low latency TID(s) within the R-TWT period based on the frame,
wherein the first frame(s) is first included in an Aggregate Medium Access Control Protocol Data Unit (A-MPDU) before the second frame(s) when the TB PPDU includes the A-MPDU in which the first frame(s) for the low latency traffic identifier (TID)(s) and the second frame(s) for the first TID(s) are aggregated.

9. The method of claim 8,
wherein the restricted conditions include i) whether all of the first frame(s) stored in a queue have been transmitted, and ii) whether the second frame(s) is aggregated with the first frame(s) and included in the A-MPDU.

10. The method of claim 8, further comprising:
receiving a specific frame including information to indicate the low latency TID(s).

11. The method of claim 8,
wherein the low latency TID(s) is mapped to at least one first Access Category (AC), and
wherein the first TID(s) is mapped to at least one second AC that is different from the at least one first AC.

12. The method of claim 11,
wherein a decrease of a first back-off counter for the at least one second AC mapped to each of the first TID(s) suspends when the R-TWT period starts.

13. The method of claim 12,
wherein after the decrease of the first back-off counter suspends within the R-TWT interval, the decrease of the first back-off counter resumes after i) all of the first frame(s) stored in a queue have been transmitted, or ii) the R-TWT period is ended.

14. The method of claim 11,
wherein a decrease of a second back-off counter for the at least one first AC mapped to each of a second TID(s) excluding the low latency TID(s) among a plurality of TIDs does not suspend within the R-TWT period.

* * * * *